United States Patent [19]

Ito et al.

[11] Patent Number: 4,768,636
[45] Date of Patent: Sep. 6, 1988

[54] FORWARD/REVERSE DRIVE CONTROLLER FOR CONTROLLING A RAPID FORWARD/REVERSE SHIFTING OF THE DRIVING MODE OF A VEHICLE EQUIPPED WITH AN AUTOMATIC TRANSMISSION

[75] Inventors: Kazunori Ito; Masaya Hyodo; Koji Niinomi; Shingo Yamada; Yoshiyasu Uchida, all of Kariya; Kiyoshi Kitagawa, Kawasaki; Seiichi Hata, Kamakura; Hideo Akima, Yokohama; Toshihide Narita, Kariya, all of Japan

[73] Assignees: Kabushiki Kaisha Toyoda Jidoshokki Seisakusho, Aichi; Fujitsu Limited, Kanagawa, both of Japan

[21] Appl. No.: 19,596

[22] PCT Filed: Jul. 26, 1986

[86] PCT No.: PCT/JP86/00395

§ 371 Date: Jan. 9, 1987

§ 102(e) Date: Jan. 9, 1987

[87] PCT Pub. No.: WO87/00489

PCT Pub. Date: Jan. 29, 1987

[30] Foreign Application Priority Data

| Jul. 26, 1985 | [JP] | Japan | 60-166348 |
| Jul. 26, 1985 | [JP] | Japan | 60-166349 |
| Aug. 14, 1985 | [JP] | Japan | 60-179199 |
| Aug. 14, 1985 | [JP] | Japan | 60-179200 |
| Aug. 14, 1985 | [JP] | Japan | 60-179201 |
| Dec. 26, 1985 | [JP] | Japan | 60-295978 |
| Dec. 26, 1985 | [JP] | Japan | 60-295979 |
| Dec. 26, 1985 | [JP] | Japan | 60-295980 |

[51] Int. Cl.⁴ .............. B60K 41/04; B60K 41/22; B60K 41/26; B60K 41/28
[52] U.S. Cl. .................. 192/0.08; 74/872; 192/0.092; 192/3.58; 192/4 C; 414/469
[58] Field of Search .......... 192/4 C, 0.08, 0.092, 192/0.062, 3.63, 3.55, 3.58; 74/872; 414/469

[56] References Cited

U.S. PATENT DOCUMENTS

| 3,348,644 | 10/1967 | Hilpert | 192/4 C |
| 3,543,891 | 12/1970 | Mathers | 192/4 C X |
| 3,910,389 | 10/1975 | Pleier | 192/4 C |
| 3,913,700 | 10/1975 | James | 192/4 C X |
| 4,300,652 | 11/1981 | Redzinski et al. | 192/4 C X |
| 4,419,909 | 12/1983 | Opperud et al. | 74/866 X |

FOREIGN PATENT DOCUMENTS 2716531 11/1977 Fed. Rep. of Germany ...... 192/4 C

Primary Examiner—Rodney H. Bonck
Attorney, Agent, or Firm—Burgess, Ryan & Wayne

[57] ABSTRACT

A forward/reverse drive controller for controlling a vehicle, in which the output of an engine is transmitted through a clutch to an automatic transmission, in which the running direction of the vehicle is changed rapidly and alternately in opposite directions. The controller utilizes a clutch controlling actuator for the variable control of the working condition of the clutch between an engaged state and a disengaged state; a speed change actuator provided in the automatic transmission to shift the automatic transmission; a running speed sensor for detecting the running speed of the vehicle; a forward-/reverse shift control lever which is shifted manually to three drive positions, a forward/reverse gear position detector; a braking control unit which applies a braking force when a forward/reverse gear position detector detects the shift of the forward/reverse shift control lever; a decision unit which decides, on the basis of the result of detection of the running speed of the vehicle, whether or not the running speed of the vehicle has been reduced to a predetermined running speed; and a shifting operation control unit which provides a command for shifting the automatic transmission to the predetermined running speed.

18 Claims, 20 Drawing Sheets

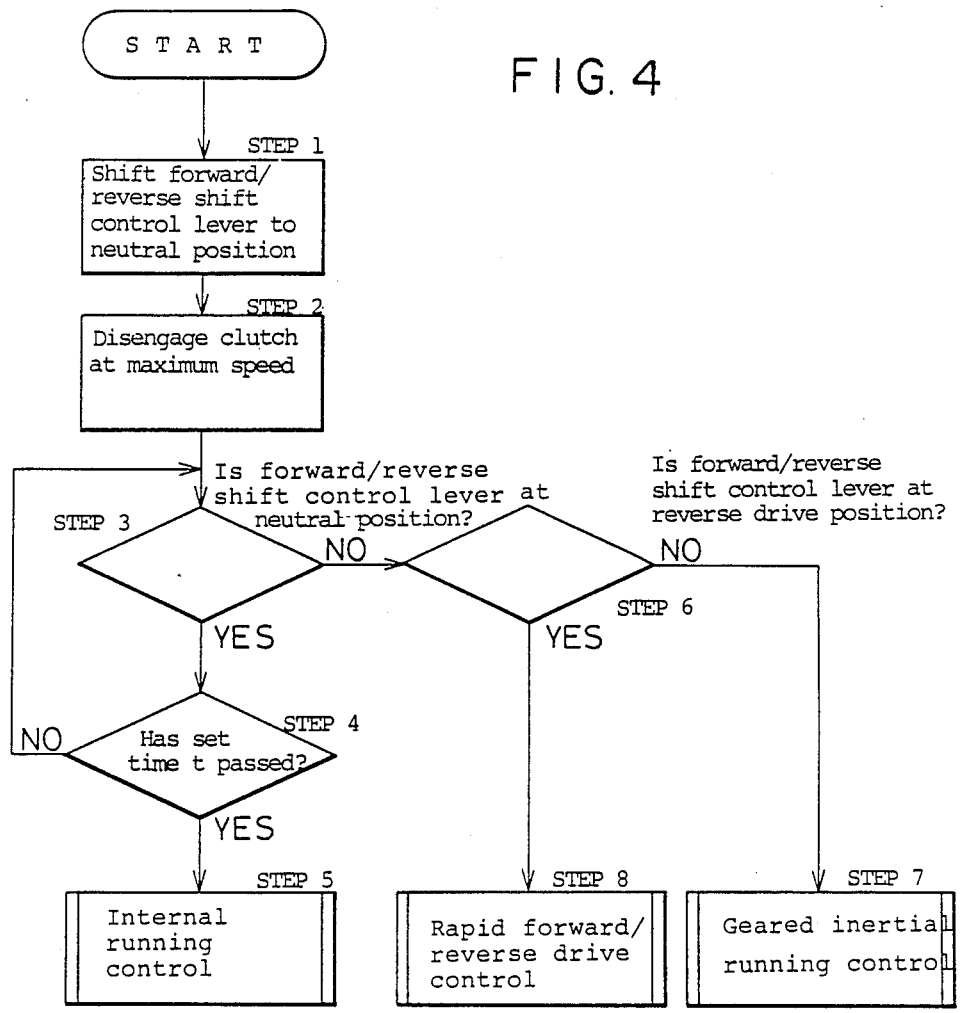

FORWARD/REVERSE DRIVE CONTROLLER FOR CONTROLLING A RAPID FORWARD/REVERSE SHIFTING OF THE DRIVING MODE OF A VEHICLE EQUIPPED WITH AN AUTOMATIC TRANSMISSION

TECHNICAL FIELD

The present invention relates to a forward/reverse drive controller for rapidly shifting the driving mode of a vehicle equipped with an automatic transmission between forward drive and reverse drive (this shifting operation will be referred to as "forward/reverse shifting operation" hereinafter) and, more particularly, to a forward/reverse drive controller applicable to industrial vehicles, such as fork lift trucks, and capable of carrying out a rapid forward/reverse shifting operation upon the operation of a forward/reverse shift control lever during the forward or reverse running of the vehicle. Note, the applicability of the present invention is not limited to a forward/reverse drive controller for only industrial vehicles.

BACKGROUND ART

The drive mode of an industrial vehicle, such as a fork lift truck, must be frequently shifted between a forward drive mode and reverse drive mode during loading/unloading work.

In an industrial vehicle equipped with a conventional manual shift transmission, a series of operations must be carried out to achieve the rapid forward/reverse shifting of the drive mode, as follows.

(1) The vehicle is braked to reduce the running speed to an extent where to-and-fro running is possible.

(2) The clutch is disengaged to shift the transmission from the second speed to the low speed, and then the forward/reverse shift control lever is operated.

(3) The throttle valve is opened while the clutch is kept in a slipping engagement to invert the running direction of the vehicle.

The series of foregoing operations is carried out by making effective use of the long experience of the driver. Therefore, sometimes, the transmission is damaged by coercive forward/reverse shifting operation at a running speed where shift-down and forward/reverse shift are impossible. In a vehicle equipped with a manual transmission, a series of such intricate operations requires a high-level operating skill, and burdens the driver with difficult work. On the other hand, various vehicles including industrial vehicles, such as fork lift trucks, equipped with an automatic transmission have been proposed in recent years. Vehicles equipped with an automatic transmission are required to allow rapid forward/reverse shifting operation in a manner that can be carried out by a skilled driver without the difficult operations necessary for the forward/reverse shifting of the drive mode of a vehicle equipped with a conventional manual transmission.

DISCLOSURE OF THE INVENTION

Accordingly, it is an object of the present invention to prevent such problems inherent in vehicles equipped with a manual transmission from being encountered by a vehicle equipped with an engine, an accelerator pedal, a clutch provided in the engine output transmission system, to connect and disconnect the engine and the driven part, and an automatic transmission to which the engine output is transmitted through the clutch.

It is another object of the present invention to provide a forward/reverse drive controller capable of controlling the driving mode of the foregoing vehicle for forward/reverse shifting operation without difficulty in the same manner as carried out by a skilled driver when driving a vehicle equipped with a manual transmission.

It is further object of the present invention to provide a forward/reverse drive controller capable of rapidly controlling the driving mode of the foregoing vehicle for forward/reverse shifting operation.

It is still a further object of the present invention to provide a forward/reverse drive controller capable of controlling the foregoing vehicle for forward/reverse shifting operation by accurately recognizing the purpose of operation of the forward/reverse shift control lever by the driver, capable of improving the accessibility by eliminating ineffective actions of the driving means for driving the clutch control mechanism and driving means for driving the automatic transmission shifting mechanism, and capable of reducing the load on and improving the durability of the driving means.

It is a further object of the present invention to provide a forward/reverse drive controller capable, when the foregoing vehicle is an industrial vehicle, of preventing accidental movement of the load by deciding a timing of the operation of the automatic transmission and the degree of deceleration of the vehicle according to the weight of a load during loading/unloading work.

It is a further object of the present invention to provide a forward/reverse drive controller capable, when the foregoing vehicle is a fork lift truck, of a rapid forward/reverse shifting operation when the fork lift truck is not loaded, and a smooth forward/reverse shifting operation when the fork lift truck is loaded for the safety of the load.

It is still a further object of the present invention to provide a forward/reverse drive controller capable, when the foregoing vehicle is a fork lift truck equipped with a tilt cylinder, of controlling the driving mode for a rapid forward/reverse shifting operation without entailing a collapse of the load.

It is a further object of the present invention to provide a forward/reverse drive controller capable, when the foregoing vehicle is a fork lift truck, of facilitating the forward/reverse shifting operation by automatically carrying out the vehicle controlling operation after the forward/reverse shifting gear of the automatic transmission has been shifted according to the quantity of the load (the number or weight of the load) through the control of the operating condition of the clutch.

It is a further object of the present invention to provide a forward/reverse drive controller capable of controlling the foregoing vehicle for a forward/reverse shifting operation so that the vehicle is decelerated smoothly regardless of the skill of the driver, and capable of achieving an optimum forward/reverse shifting operation by further minutely controlling the degree of deceleration according to the load on the vehicle.

According to the present invention, there is provided a forward/reverse drive controller suitable for controlling the forward/reverse shifting operation of a vehicle having an engine, an accelerator pedal, a clutch provided in the engine output transmission system, to connect and disconnect the engine and the driven part, and an automatic transmission, which comprises, in combination: clutch driving means for the variable control of the working condition of the clutch between an engaged state and a disengaged state through slipping engagement; transmission driving means provided in the automatic transmission to shift the automatic transmission between three drive positions, namely, a forward speed, a neutral position, and a reverse speed; running speed detecting means for detecting the running speed of the vehicle; a forward/reverse shift control lever which is shifted manually to a plurality of shift positions including a forward drive position, a neutral position and a reverse drive position; shift position detecting means for detecting the position of the forward/reverse shift control lever; braking control means which actuates the braking means of the vehicle to decelerate the vehicle upon the detection of the shift of the forward/reverse shift control lever to invert the running direction of the vehicle; means for detecting whether or not the running speed of the vehicle has been decelerated to a predetermined speed by the braking means, on the basis of the result of running speed detection by the running speed detecting means; and shift control means which provides a command to actuate the transmission driving means in order to shift the automatic transmission according to the result of decision of the decision means, when the running speed of the vehicle is reduced to the predetermined speed, and provides a command upon the completion of the shift of the automatic transmission to actuate the transmission driving means in order to engage the clutch.

BRIEF DESCRIPTION OF THE DRAWINGS

FIGS. 4, 5A, 5B and 6 are flow charts of assistance in explaining the functions of the forward/reverse drive controller particularly in terms of the manner of operation mainly for forward/reverse shifting;

BEST MODE FOR CARRYING OUT THE INVENTION

Figure 1:
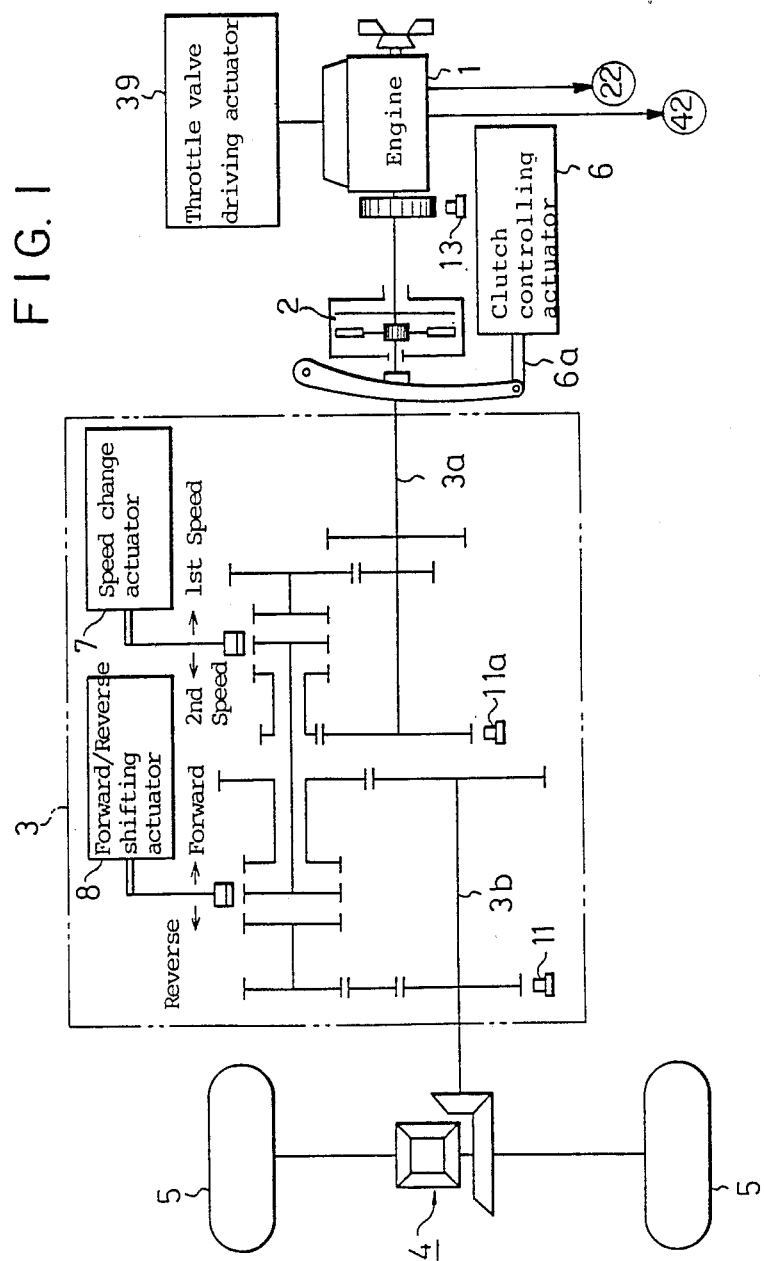
FIG. 1 is a block diagram of the driving mechanism of an industrial vehicle, particularly, a fork lift truck, equipped with a forward/reverse drive controller, according to a first embodiment of the present invention.

Referring to FIG. 1 showing the driving mechanism of a vehicle equipped with a forward/reverse drive controller embodying the present invention, the output of an engine 1 is transmitted through a dry single disk clutch 2 to an automatic transmission 3. The automatic transmission 3 has an input shaft 3a and an output shaft 3b, which drive the driving wheels 5 through a differential gear 4 for forward running or reverse running. The output speed of the automatic transmission 3 is changed at a predetermined speed change ratio. The engine 1 is used also for driving a hydraulic pump which supplies hydraulic fluid to a lift cylinder for raising and lowering a fork, and to a tilt cylinder for tilting a mast.

The condition of engagement of the dry single disk clutch 2 for connecting and disconnecting the output of the engine 1 and the driven part is regulated by a clutch controlling actuator 6 employed as a clutch actuating means, according to the distance of axial stroke of a rod 6a. On the other hand, the automatic transmission 3 is placed in a first speed (low speed) or a second speed (high speed) by a speed change actuator 7. The automatic transmission 3 is also placed in a forward running gear position, a neutral position, or a reverse running gear position by a forward/reverse shifting actuator 8.

The throttle valve 1a (FIG. 2) of the engine 1 is operated by a throttle valve driving actuator 39, which operates according to the working angle of the accelerator pedal, not shown, controlled by the driver. When carrying out a rapid forward/reverse shifting operation for inverting the running direction of the fork lift truck, the throttle valve driving actuator closes the throttle valve 1a regardless of the working angle of the accelerator pedal.

Figure 2:
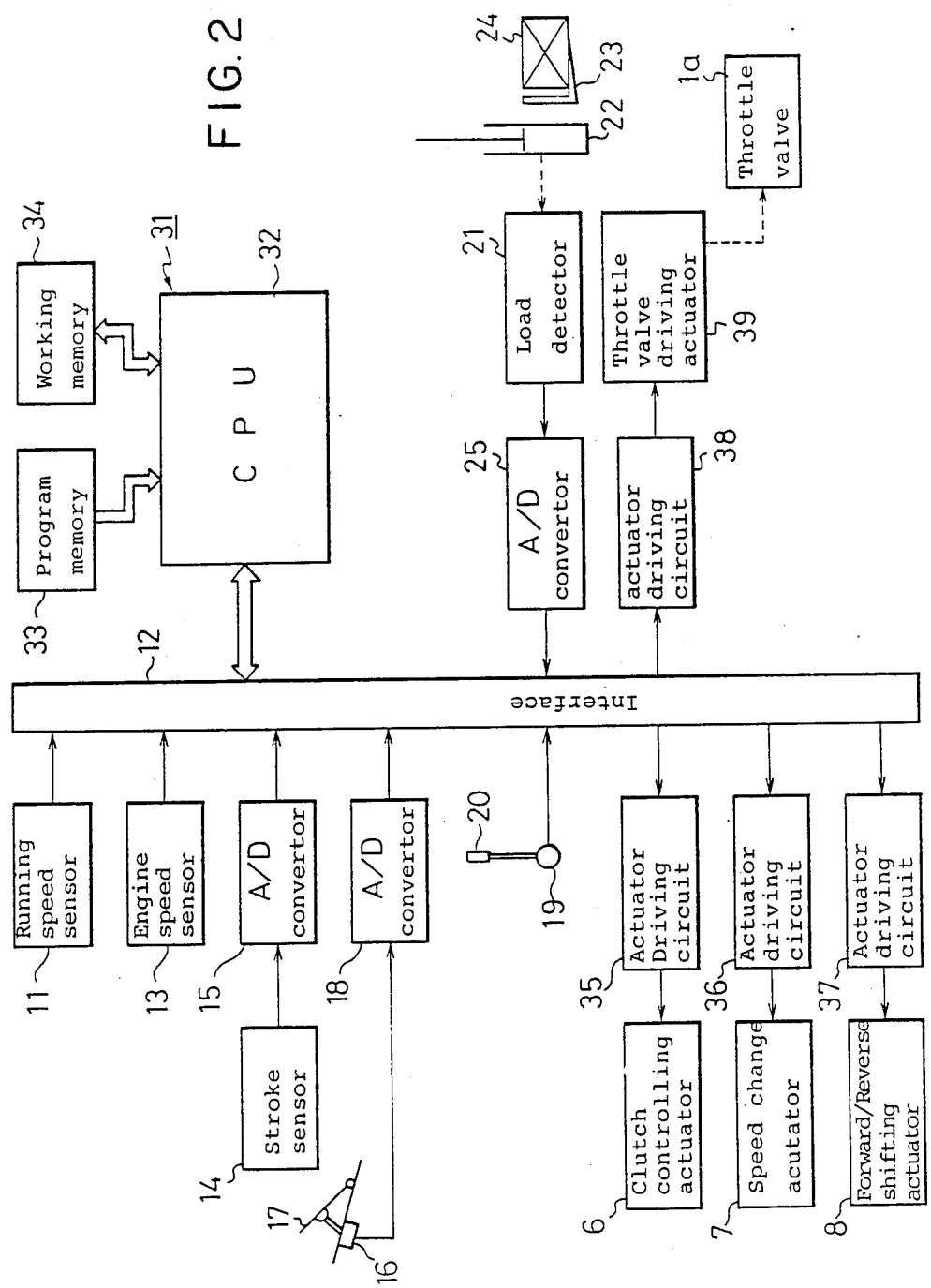
FIG. 2 is an electrical circuit diagram showing the connection of the components and circuits of the forward/reverse drive controller of FIG. 1.

An electrical circuit employed in the forward/reverse drive controller of the present invention for forward/reverse shifting operation will be described with reference to FIG. 2.

As illustrated in FIG. 1, a running speed sensor 11 employed as a running speed detecting means detects the revolving speed of the output shaft of the automatic transmission 3 and sends a detection signal to an input-output interface 12. As shown in FIG. 1, an engine speed sensor 13 detects the revolving speed of the input shaft of the engine 1 and sends a detection signal to the interface 12. The interface 12 calculates the difference between the detection signal of the engine speed sensor 13 and the detection signal of an input shaft speed sensor 11a for detecting the revolving speed of the input shaft 3a of the automatic transmission 3. A CPU 32, which will be described below, determines the condition of engagement of the clutch 2 on the basis of the difference obtained by the interface 12.

A stroke sensor 14 is a potentiometer, which detects the distance of stroke of the rod 6a of the clutch controlling actuator 6 and sends a detection signal to an A/D converter 15. The A/D converter 15 converts the detection signal of the stroke sensor 14 into a digital signal and sends the digital signal to the interface 12. A pedal operation quantity sensor 16 is a potentiometer, which detects the working angle $\theta x$ of an accelerator pedal 17 provided near the driver's seat. The detection signal of the pedal operation quantity sensor 16 is converted into a digital signal by an A/D converter 18, and then the digital signal is sent to the interface 12.

A forward/reverse gear position detector 19 provided as a means for detecting gear position detects the shift positions (forward drive position, neutral position, and reverse drive position) of a forward/reverse shift control lever 20 also provided near the driver's seat and sends a detection signal to the interface 12. The forward/reverse gear position detector 19 may comprise, for example, electrical switches disposed at positions corresponding to the shift positions, respectively, of the forward/reverse shift control lever 20. A load detector 21 comprises a pressure sensor, which detects the pressure of the hydraulic fluid in the lift cylinder 22 and hence the weight of a load 24 on the fork 23. The detection signal of the load detector 21 is converted into a digital signal by an A/D converter 25, and then the digital signal is sent to the interface 12.

A microcomputer 31 capable of functioning as a braking control means, decision means and shift control means comprises a central processing unit (hereinafter abbreviated to "CPU") 32, a read-only memory (ROM) as a program memory 33 storing control programs, and a random access memory (RAM) as a working memory 34 for temporarily storing the results of operation. The CPU 32 operates on the basis of program data stored in the program memory 33. The CPU 32 received the detection signals of the sensors and switches through the interface 12. The CPU 32 calculates the instantaneous running speed Vx and acceleration Ax of the fork lift truck from moment-to-moment on a basis of the detection signals provided by the running speed sensor 11, and also the instantaneous engine speed on the basis of the detection signals provided by the engine speed sensor 13, and stores the calculation results in the working memory 34. Similarly, the CPU 32 calculates the instant distances of the stroke of the rod 6a of the clutch controlling actuator 6, and hence the condition of engagement of the clutch 2, on the basis of the detection signals provided by the stroke sensor 14, and also the instant working angle $\theta x$ of the accelerator pedal 17 on the basis of the detection signals provided by the pedal operation quantity sensor 16, and then stores the results of calculation in the working memory 34.

Furthermore, the CPU 32 decides the shift position of the forward/reverse shift control lever 20 on the basis of the detection signal of the forward/reverse gear position detector 19, calculates the load Gx, namely, the weight of the load, on the basis of the detection signal of the load detector 21, and stores the calculation result in the working memory 34.

The CPU 32 operates the detection signals and makes a decision on the basis of data stored beforehand in the program memory 33.

The CPU 32 drives the clutch controlling actuator 6, the change speed actuator 7, and the forward/reverse shifting actuator 8 through the interface 12 and actuator driving circuits 35, 36, and 37, respectively, on the basis of predetermined program data. The CPU 32 further drives the throttle valve driving actuator 39 through the interface 12 and an actuator driving circuit 38 on the basis of predetermined program data. The throttle valve driving actuator 39 is operatively connected with the throttle valve 1a of the engine 1 to control the degree of opening of the throttle valve 1a.

The actuator driving circuit 38 and the throttle valve driving actuator 39 may be, for example, a motor driving circuit and a well-known stepping motor to be electrically driven by the motor driving circuit, respectively, in which the degree of opening of the throttle valve 1a is controlled by controlling the amount of rotation of the stepping motor.

When the CPU 32 decides that the forward/reverse shift control lever 20 has been shifted to the neutral position while the fork lift truck is running, the CPU 32 performs a running mode discrimination routine, namely, a routine to discriminate the purpose of shifting the forward/reverse shift control lever to the neutral position among the to-and-fro running mode, geared inertial running mode, and inertial running mode.

The CPU 32 controls the clutch controlling actuator 6, the speed change actuator 7, and the forward/reverse shifting actuator 8 according to the predetermined program on the basis of the discrimination for rapid to-and-fro running mode, geared inertial running mode or inertial running mode.

Figure 3:
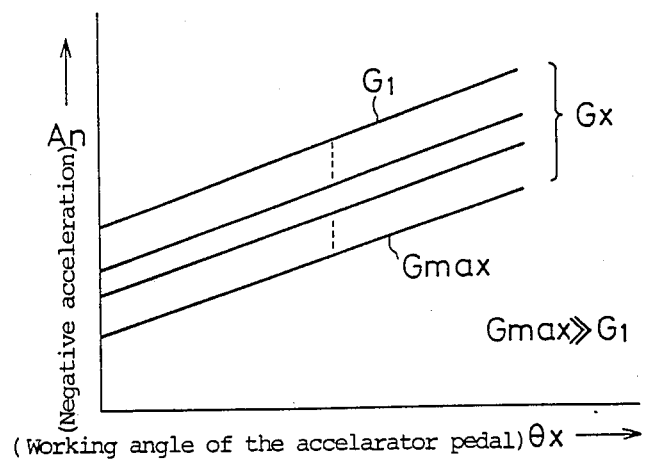
FIG. 3 is a graph showing the relationship between negative acceleration and the working angle of the accelerator pedal for the forward/reverse drive controller.

When the automatic transmission 3 is shifted to a gear for running in a direction opposite to the present running direction of the fork lift truck during the later described to-and-fro running mode, the CPU 32 controls the acceleration of the fork lift truck at a predetermined negative acceleration An corresponding to the present working angle $\theta x$ of the accelerator pedal 17 and according to the load Gx, namely, the weight of the load 24 as shown in FIG. 3.

The negative acceleration An corresponding to the working angle $\theta x$ is calculated on the basis of data previously stored in the program memory 33.

The control of the acceleration of the fork lift truck at the negative acceleration An is achieved through the control of the condition of engagement of the dry single disk clutch 2 by the CPU 32, namely, through the control of the distance of the stroke of the rod 6a of the clutch controlling actuator 6.

Figure 5A:
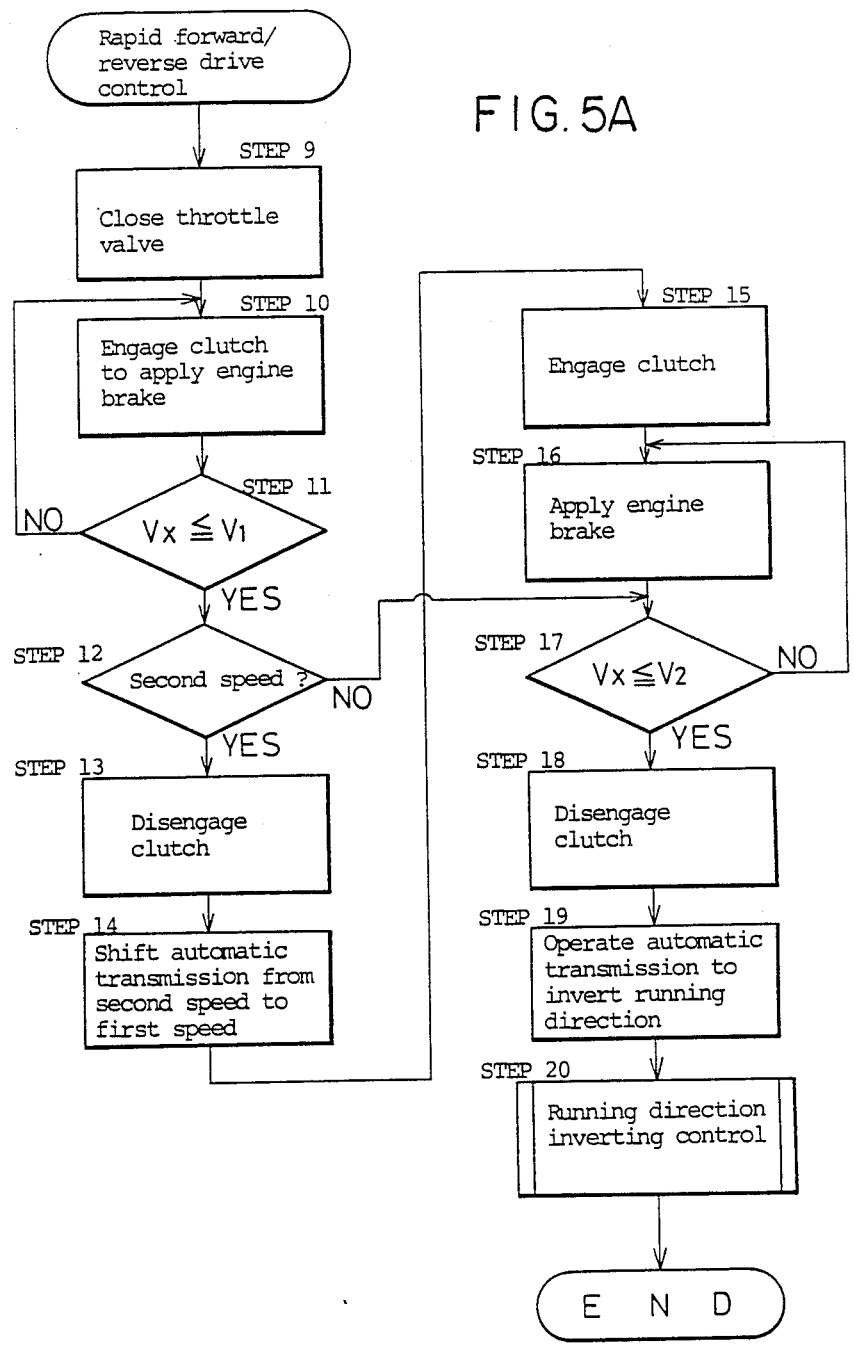
Figure 6:
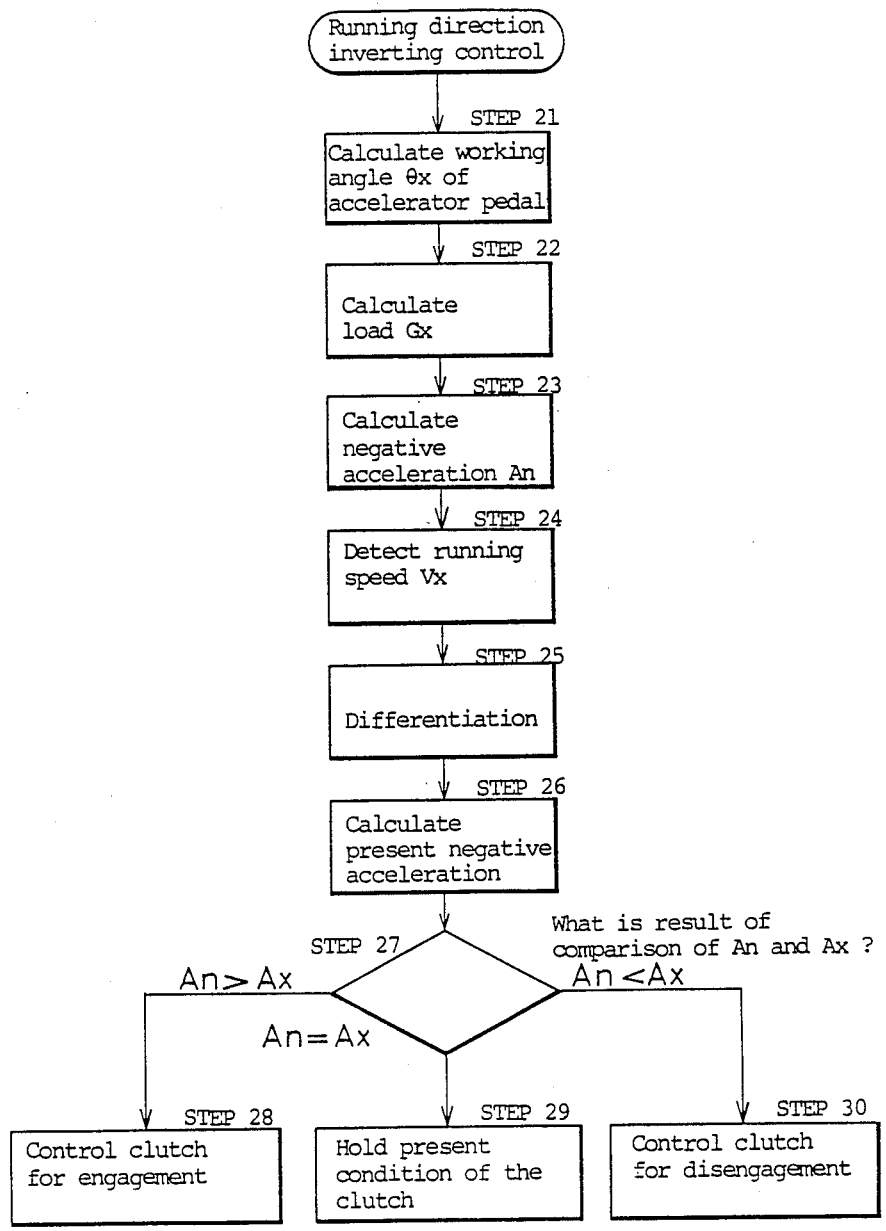

The operation of the electrical circuit thus constituted will be described hereinafter with reference to the flow charts shown in FIGS. 4, 5A and 6.

When the forward/reverse shift control lever 20 is shifted from the forward gear position to the neutral position while the fork lift truck is running forward at a given running speed, the CPU 32 determines that the forward/reverse shift control lever 20 has been shifted to the neutral position, on the basis of the detection signal of the forward/reverse gear position detector 19 (Step 1), and then the CPU 32 drives the clutch controlling actuator 6 through the interface 12 and the actuator driving circuit 35 to disengage the dry single disk clutch 2 at the maximum speed (Step 2). Simultaneously, the CPU 32 actuates a built-in timer thereof, and then makes a decision as to whether or not the forward-/reverse shift control lever 20 has been shifted to a gear position other than the neutral position within a predetermined time hereinafter referred to as "set time t"; in this embodiment, the set time t is 1 sec) (Steps 3 and 4).

If the forward/reverse shift control lever 20 is not shifted within the set time t, the CPU 32 executes an inertial running control routine for the inertial running of the fork lift truck (Step 5). That is, the CPU 32 decides, upon the elapse of the set time, that an inertial running mode has been chosen and drives the forward-/reverse shifting actuator 8 to shift the automatic transmission 3 from the forward gear to the neutral, and then engages the dry single disk clutch 2. Consequently, the fork lift truck runs by inertia.

On the other hand, if the forward/reverse shift control lever 20 is shifted again to the forward gear within the set time t, the CPU 32 decides that a geared inertial running mode has been chosen (Step 6) and executes a geared inertial running control routine for the forward running of the fork lift truck (Step 7). Upon the shift of the forward/reverse shift control lever 20 to the forward gear position, the CPU 32 operates so as to engage the dry single disk clutch 2. Consequently, the fork lift truck continues forward running.

If the forward/reverse shift control lever 20 is shifted to the reverse gear position within the set time t, the CPU 32 decides that a rapid to-and-fro running mode is chosen (Step 6), and then executes a rapid to-and-fro running control routine for the rapid to-and-fro running of the fork lift truck (Step 8).

Upon the shift of the forward/reverse shift control lever 20 from the neutral position to the reverse gear position, the CPU 32 drives the throttle valve driving actuator 39 so that the throttle valve 1a is completely closed (Step 9). At the same time, the CPU 32 operates so as to drive the clutch controlling actuator 6 to thereby engage the dry single disk clutch 2, while the fork lift truck is decelerated by applying engine brake so that the running speed Vx is reduced to a predetermined first reference speed V1 (in this embodiment, a speed at which the automatic transmission 3 can be shifted from the second speed to the first speed) stored in the program memory 33 (Steps 10 and 11). During the deceleration, the CPU 32 compares the present running speed Vx calculated on the basis of the detection signal of the running speed sensor 11 from moment-to-moment with the first reference speed V1 to decide whether or not the running speed has been reduced to the first reference speed V1.

When the running speed Vx is reduced to a speed below the first reference speed V1, the CPU makes a decision as to whether the automatic transmission 3 is placed in the second speed or in the first speed (Step 12). When the automatic transmission 3 is placed in the first speed, the CPU 32 makes a decision as to whether or not the fork lift truck is decelerated to an extent where the running speed Vx is below a second reference speed V2 (in this embodiment, a speed at which the automatic transmission 3 can be shifted from the forward gear to the reverse gear) stored beforehand in the program memory 33 (Step 17).

On the other hand, when the automatic transmission 3 is placed in the second speed, the CPU 32 operates so as to drive the clutch controlling actuator 6, thereby disengaging the dry single disk clutch 2 (Step 13), and then controls the speed change actuator 7 through the actuator driving circuit 36 to shift the automatic transmission 3 from the second speed to the first speed (Step 14). After the automatic transmission has been placed in the first speed, the CPU 32 controls the clutch controlling actuator 6 again to engage the dry single disk clutch 2 (Step 15) and applies engine brake to decelerate the fork lift truck so that the running speed Vx is reduced to the predetermined second reference speed V2 (Steps 16 and 17).

When the running speed Vx is reduced to a speed below the second reference speed V2, the CPU 32 operates so as to disengage the dry single disk clutch 2 (Step 18), and then to drive the actuator driving circuit 37 to thereby shift the automatic transmission 3 from the forward gear to the reverse gear (Step 19). At the same time, the CPU 32 controls the throttle valve driving actuator 39 to open the throttle valve, which has been closed completely, to a degree of opening corresponding to the working angle $\theta x$ of the accelerator pedal 17 and execute a control operation to invert the running direction of the fork lift truck (Step 20).

After the automatic transmission 3 has been shifted from the forward gear to the reverse gear (Step 19), the CPU 32 calculates the present working angle $\theta x$ of the accelerator pedal 17 on the basis of the detection signal of the pedal operation quantity sensor 16 and calculates the present load Gx on the basis of the detection signal of the load detector 21 (Steps 21 and 22) to enable the fork lift truck to start reverse running immediately after the fork lift truck has been further decelerated to a stop.

The CPU hunts the program memory 33 to select data for calculating a negative acceleration An corresponding to the working angle $\theta x$ shown in FIG. 3 for the present load Gx. After selecting the data for calculating the negative acceleration corresponding to the working angle $\theta x$, the CPU 32 calculates a negative acceleration An corresponding to the calculated working angle $\theta x$ on the basis of the selected data (Step 23).

On the other hand, the CPU 32 differentiates the detection signals of the running speed sensor 11 to calculate the present negative acceleration of the fork lift truck (Steps 24, 25 and 26). Then, the CPU 32 operates so as to drive the clutch controlling actuator 6 to control the condition of engagement of the dry single disk clutch 2 so that the actual negative acceleration Ax coincides with the negative acceleration An obtained at Step 23 (Steps 27 to 30). That is, the degree of slipping engagement of the clutch 2 is regulated so that the slip is increased (Step 30) when the actual negative acceleration Ax is greater than the calculated negative acceleration An and, on the contrary, the degree of slipping engagement of the clutch 2 is regulated so that the slip is reduced (Step 28) when the actual negative acceleration Ax is smaller than the calculated negative acceleration An, in order to make the actual negative acceleration coincide with the calculated negative acceleration An.

Upon the coincidence of the actual negative acceleration Ax with the calculated negative acceleration An, the CPU 32 controls the clutch 2 so that the present condition of slipping engagement is maintained (Step 29).

Accordingly, the negative deceleration An can be varied according to the present working angle $\theta x$ of the accelerator pedal 17.

Thus, the fork lift truck is decelerated by the negative acceleration An, and then the running direction is inverted for reverse running to complete the rapid forward/reverse drive shifting operation.

Although the procedure of the rapid forward/reverse drive shifting operation has been described in terms of the procedure for shifting forward drive to reverse drive, the rapid forward/reverse drive shifting operation for shifting reverse drive to forward drive is achieved through the similar procedure.

In this embodiment, since the negative acceleration An can properly be varied according to the working angle $\theta x$ of the accelerator pedal 17, the speed of inversion in the forward/reverse drive shifting operation can be discretionarily increased. Moreover, since the negative acceleration An relative to the working angle $\theta x$ of the accelerator pedal 17 is diminished with the increase of the load Gx on the fork lift truck, namely, since the negative acceleration An relative to the working angle $\theta x$ is diminished with the increase of the load Gx, optimum smooth deceleration is always possible regardless of the skill of the driver and the quantity of the load, and hence there is no danger of the fork lift truck laterally falling during deceleration due to the unbalanced distribution of the weight.

Furthermore, in this embodiment, since the running speed of the fork lift truck is reduced to the predetermined reference speeds V1 and V2 before shifting the automatic transmission 3 from forward drive to reverse drive during to-and-fro running operation by applying engine brake, the gears of the automatic transmission 3 are smoothly synchronized in shifting the automatic transmission 3 from the second speed to the first speed, and from the forward drive to the reverse drive, and hence there is no danger of damaging the automatic transmission 3 and the automatic transmission can be smoothly shifted for the forward/reverse drive shifting operation regardless of the skill of the driver.

Still further, in this embodiment, since the automatic transmission 3 is not shifted immediately after the shift of the forward/reverse shift control lever 20 to the neutral position during running and a decision is made before shifting the automatic transmission 3 as to the subsequent running mode (inertial running, geared inertial running or to-and-fro running), useless operation of the clutch controlling actuator means and the automatic transmission shifting mechanism actuator means is eliminated, and thereby the accessibility is improved, the load on those actuator means is reduced, and hence the durability of those actuator means is enhanced.

Figure 5B:
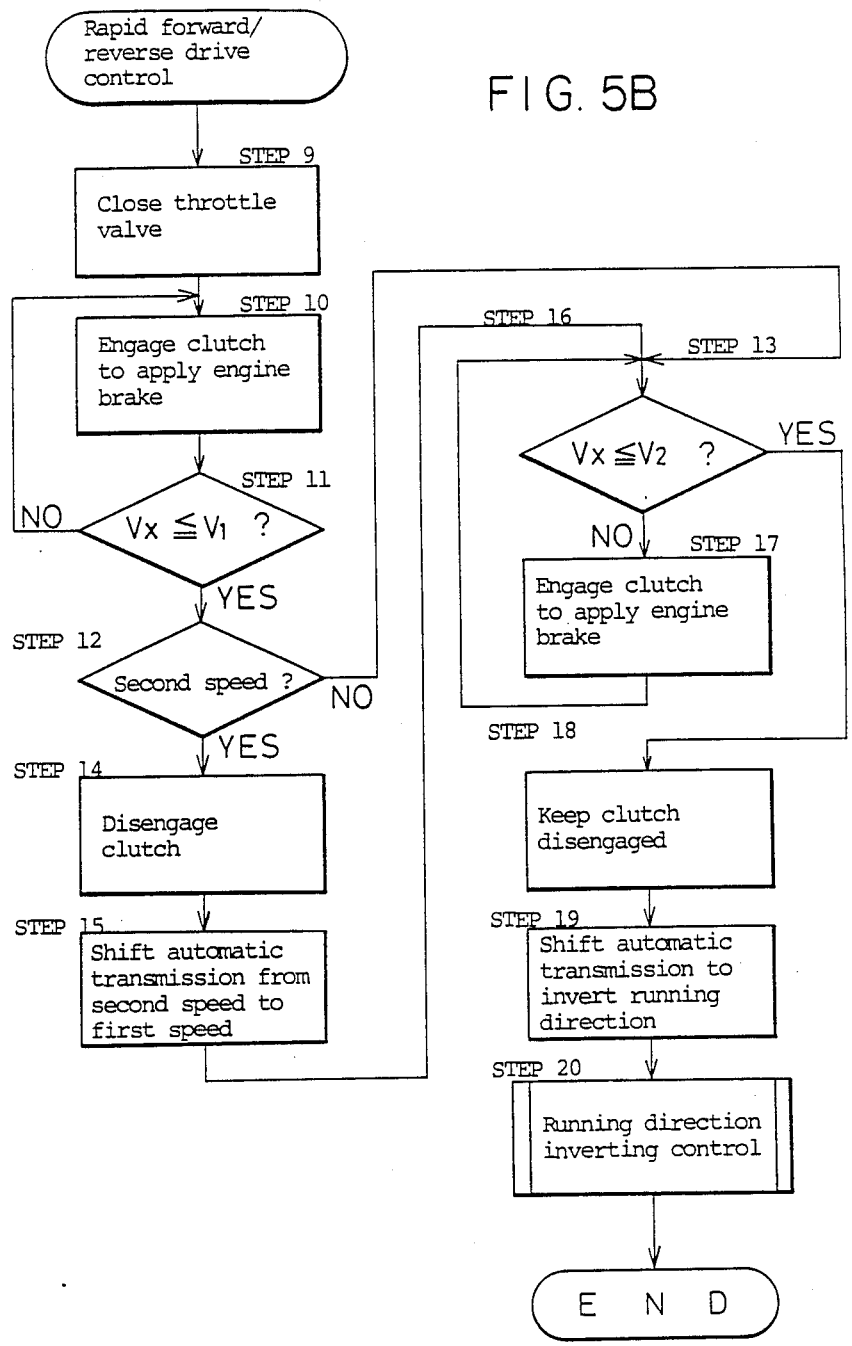

The manner of operation of the embodiment is not limited to that described hereinbefore; the first reference speed V1 and the second reference speed V2 may be properly varied, and the first reference speed V1 and the second reference speed V2 may be the same, and the application of engine brake when the automatic transmission is placed in the first speed may be omitted as shown in the flow chart of FIG. 5B.

Furthermore, in decelerating the fork lift truck before shifting the forward drive to the reverse drive for the forward/reverse drive shifting operation, the fork lift truck may be positively braked by actuating the disk brakes of the fork lift truck under the control of the CPU 32 when a long time is necessary for reducing the present running speed Vx to the first reference speed V1 because the present running speed Vx is high, or when quick deceleration of the fork lift truck is required. In such a case, the disk brakes are actuated when the running speed is higher than a predetermined set speed, and then the disk brakes are released when the running speed is reduced below the set speed.

Furthermore, although this embodiment is designed to operate the negative acceleration An relative to the working angle $\theta x$ of the accelerating pedal 17 according to the load Gx on the fork lift truck, the controller may be constituted so as to provide a single negative acceleration An corresponding to the working angle $\theta x$ regardless of the load Gx.

Still further, the deceleration of the fork lift truck may be controlled by controlling the slip of the clutch 2 in the slipping engagement simply relative to the working angle $\theta x$ of the accelerator pedal 17, without setting the negative deceleration An.

Figure 7:
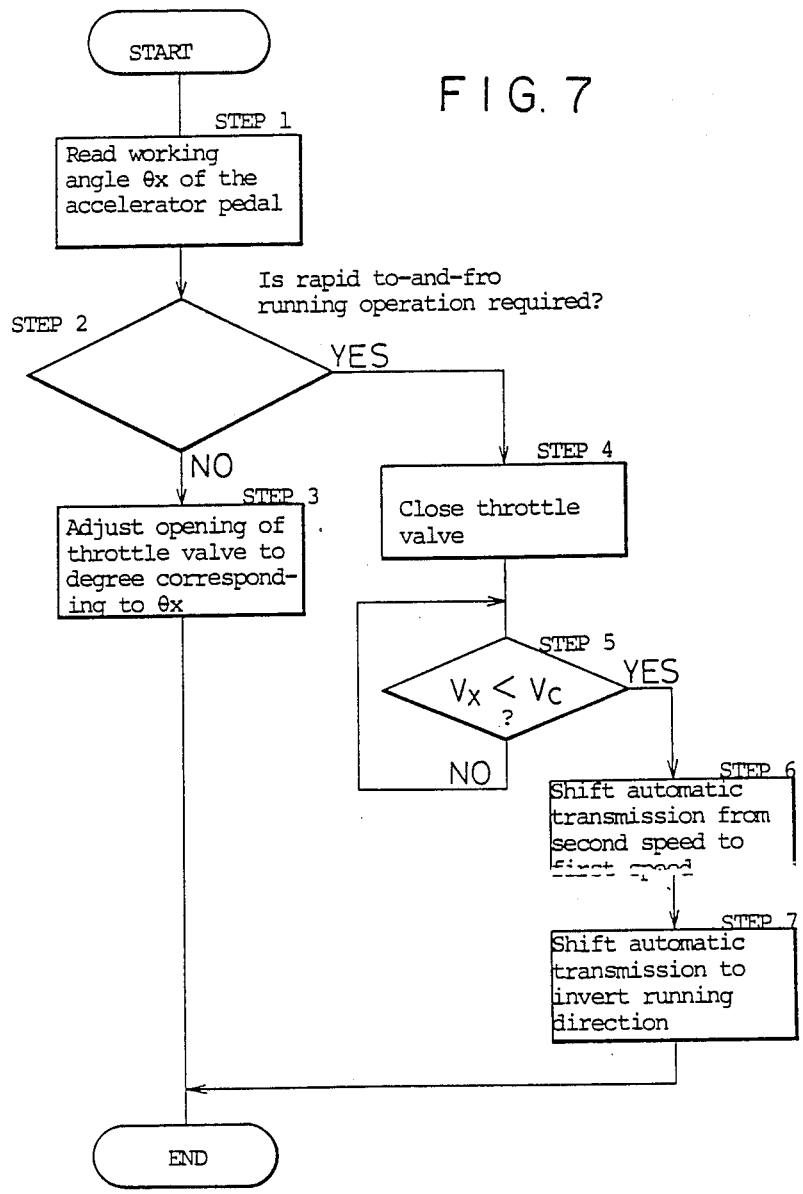
FIG. 7 is a flow chart of assistance in explaining the functions of an embodiment in which the throttle valve of the engine is closed regardless of the working angle of the accelerator pedal during the forward/reverse shifting operation.

Furthermore, the controller may be constituted so as to discriminate between the forward/reverse drive shifting operation and the normal operation, to decelerate the fork lift truck by closing the throttle valve 1a of the engine 1 regardless of the working angle of the accelerator pedal 17 during the forward/reverse drive shifting operation so that the automatic transmission is shifted from the second speed to the first speed when the running speed Vx detected by the running speed sensor 11 coincides with a fixed reference speed Vc. In such a case, the CPU 32 is constituted so as to control the degree of opening of the throttle valve 1a by actuating the throttle valve driving actuator 39 according to the detection signal corresponding to the working angle $\theta x$ given thereto through the A/D converter 18 from the pedal operation quantity sensor 16. FIG. 7 is a flow chart showing the steps of a routine of the CPU 32 constituted as described above.

In the forward/reverse drive controller in the foregoing embodiment, the running speed of the vehicle is reduced to a predetermined speed before shifting the automatic transmission from the forward drive to the reverse drive or vice versa in executing the forward/reverse rapid drive shifting operation, so that the automatic transmission can be smoothly shifted between the forward drive mode and the reverse drive mode regardless of the skill of the driver.

Still further, since the automatic transmission is not shifted immediately after the shift of the forward/reverse shift control lever to the neutral position and a decision is made before shifting the automatic transmission as to the subsequent running mode on the basis of the operation of the forward/reverse shift control lever in a predetermined set time, the purpose of operation of the forward/reverse shift control lever is decided accurately to eliminate the useless operation of the clutch actuator means and the automatic transmission shifting mechanism actuator means, so that the accessibility is improved, the load on those actuator means is reduced and the durability of those actuator means is improved.

FIGS. 8 to 12 illustrate another embodiment of the present invention. A forward/reverse drive controller in this embodiment drives the brake actuator means automatically for forward/reverse drive shifting operation so that an appropriate negative acceleration corresponding to the load detected by a load detector is obtained. When the vehicle speed is reduced to a predetermined speed, a forward/reverse shifting actuator means is first operated so that the transmission is shifted from the present gear position to a gear position for driving the vehicle in a direction opposite to the present running direction, and then after the completion of the gear position shifting, a clutch actuator means and a transmission speed change actuator means are operated so that the clutch is engaged. It should be understood that the same reference numerals as those in FIGS. 1 through 6 designate the same or like components and circuits.

Figure 8:
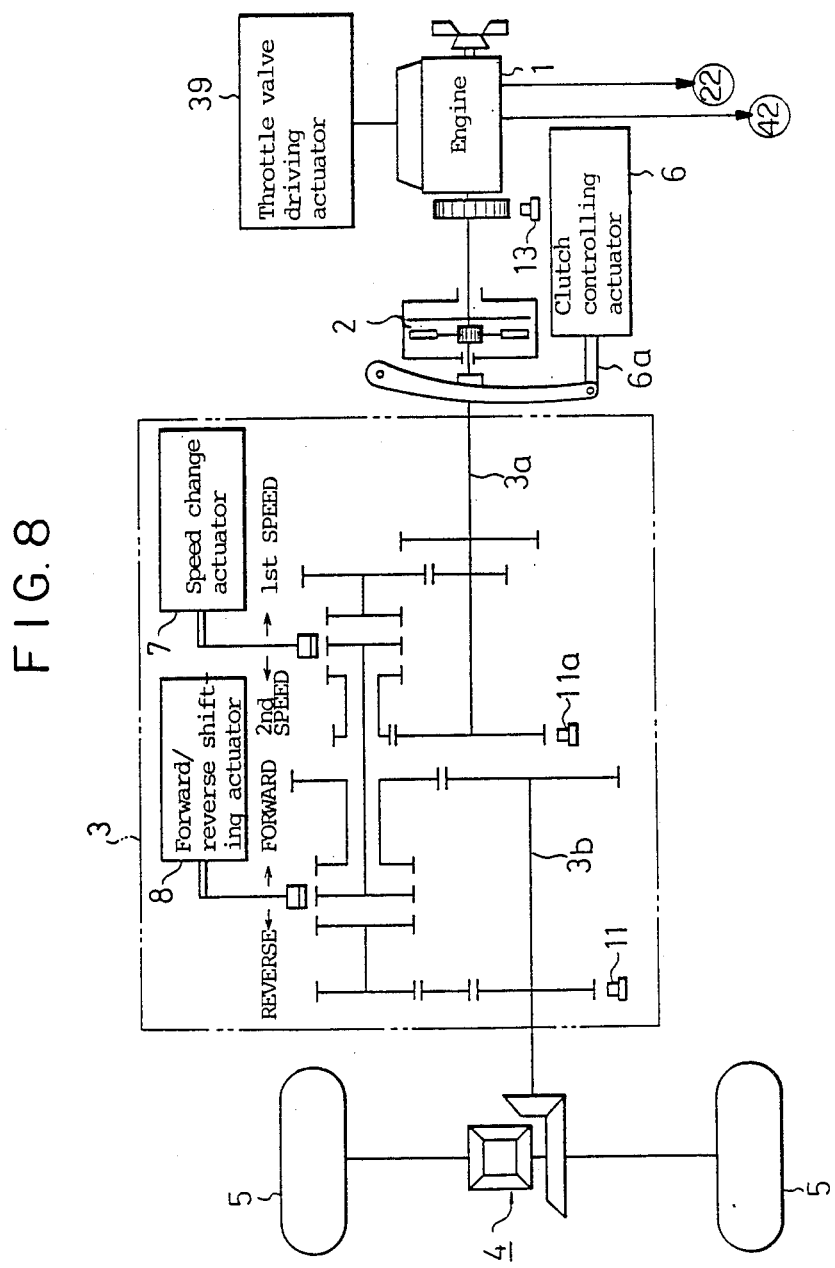
FIG. 8 is a block diagram, similar to that of FIG. 1, of the driving mechanism of an industrial vehicle equipped with a forward/reverse drive controller, according to a second embodiment of the present invention.

Referring to FIG. 8 showing the arrangement of the driving system of a fork lift truck, the output of an engine 1 is transmitted through a dry single disc clutch 2 to an automatic transmission 3. The output of the automatic transmission is transmitted at a fixed speed change ratio through a differential gear 4 to drive wheels 5 for forward running or reverse running. The engine 1 is used also for driving a hydraulic pump which supplies hydraulic fluid to a lift cylinder 22 for raising and lowering a fork 23 and to a tilt cylinder 42 for tilting a mast (not shown).

The condition of engagement of the dry single disc clutch 2 for connecting and disconnecting the output of the engine 1 and the driven part is regulated by a clutch controlling actuator 6 employed as clutch actuating means depending upon the extent of the stroke of a rod 6a. On the other hand, the automatic transmission 3 is placed in a first speed (low speed) or a second speed (high speed) by a speed change actuator 7. The automatic transmission is also placed in a forward running gear position, a neutral position or a reverse running gear position by a forward/reverse shifting actuator 8.

Figure 9:
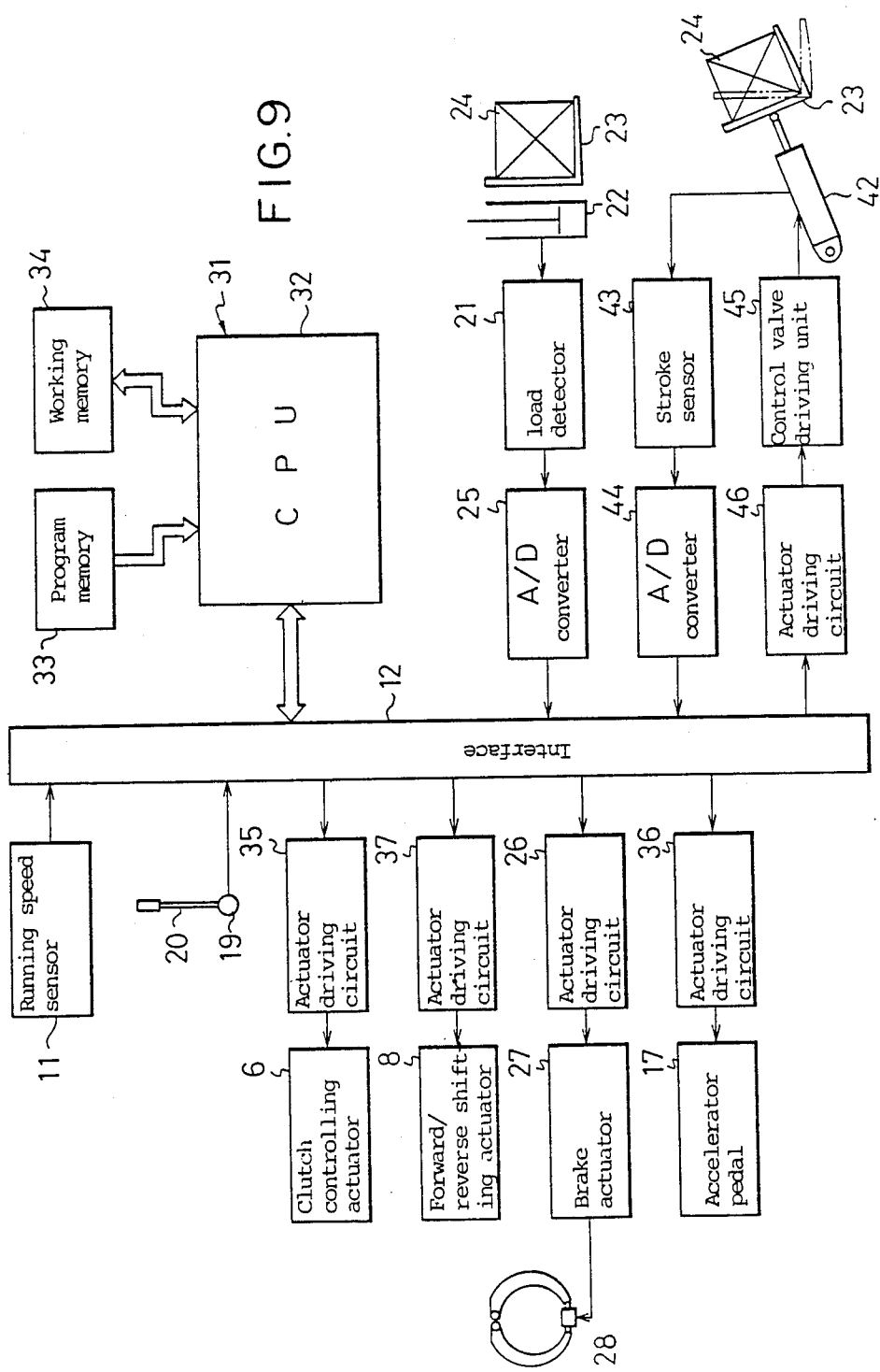
FIG. 9 is an electrical circuit diagram showing the connection of the components and circuits of the forward/reverse drive controller of FIG. 8.

The functions of electrical circuits for controlling the actuators 6, 7, and 8 will be described with reference to FIG. 9.

As illustrated in FIG. 8, a running speed sensor 11 detects the revolving speed of the output shaft 3b of the automatic transmission 3 and sends a detection signal to an input-output interface 12. A forward/reverse gear position detector 19 detects the shift position (forward drive position, neutral position, and reverse drive position) of a forward/reverse shift control lever 20 provided near the driver's seat and sends a detection signal to the interface 12.

A load detector 21 for detecting the weight of the load is a pressure sensor which detects the pressure of the hydraulic fluid in the lift cylinder 22, namely, the weight of a load 24 on the fork 23, and sends a detection signal to an A/D converter 25, which converts the detection signal of the load detector 21 into a digital signal and sends the digital signal to the interface 12.

A rearward tilt angle of the fork 23 is detected through the detection of the distance of the stroke of the piston rod of the tilt cylinder 42 by means of a stroke detector 43 comprising a potentiometer. The detection signal of the stroke detector 43 is converted into a corresponding digital signal by an A/D converter 44, and is then sent to the interface 12.

A microcomputer 31 which functions as an indexing means and shift control means comprises a central processing unit (hereinafter abbreviated to "CPU") 32, a read-only memory (ROM) as a program memory 33 storing control programs, and a random access memory (RAM) as a working memory 34 for temporarily storing the results of operations. The CPU 32 operates on the basis of the program stored in the program memory 33.

The program memory 33 stores beforehand, in addition to the control programs, data representing the relationship between an appropriate negative acceleration An for rapid forward/reverse drive shifting operation and the weight of a cargo, namely, the load Ld.

The CPU 32 receives the detection signals of the sensors and detectors through the input-output interface 12. The CPU 32 operates the subsequent detection signals of the running speed sensor 11 to calculate the present running speed and acceleration from moment-to-moment, and then stores the operation results in the working memory 34. The CPU 32 decides the present shift position of the forward/reverse shift control lever 20 on the basis of the detection signal of the forward/reverse gear position detector 19.

Moreover, the CPU 32 calculates the weight of the present cargo, namely, the load, on the basis of the detection signal of the load detector 21, and then stores the calculation results in the working memory 34. Furthermore, the CPU 32 calculates the rearward tilt angle of the fork on the basis of the detection signal of the stroke detector 43, and then stores the calculation results in the working memory 34.

The operations of the detection signals and the decisions by the CPU 32 are conducted on the basis of data stored beforehand in the program memory 33.

The CPU controls the clutch controlling actuator 6, the speed change actuator 7, the forward/reverse shifting actuator 8, a brake actuator 27, and a control valve driving unit 45 for controlling the tilt cylinder 42, through the input-output interface 12 and actuator driving circuits 35, 36, 37, 26, and 46 on the basis of predetermined program data.

When the CPU 32 decides that the forward/reverse shift control lever 20 has been shifted to the neutral position while the fork lift truck is running, the CPU 32 executes a routine to discriminate the purpose of shifting the forward/reverse shift control lever 20 to the neutral position among rapid to-and-fro running, geared inertial running and inertial running. On the basis of the decision, the CPU 32 controls the clutch controlling actuator 6 and the forward/reverse shifting actuator 8 according to a predetermined program for rapid to-and-fro running, geared inertial running or inertial running.

Figure 10:
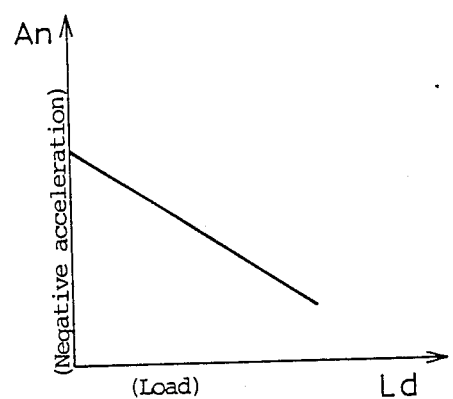
FIG. 10 is a graph showing the relationship between negative acceleration and a load.

When a decision that to-and-fro running is required is made, the CPU 32 controls the brake 28 on the basis of the relationship between the load Ld and the optimum negative acceleration An shown in FIG. 10 so that an optimum negative acceleration according to the weight of the cargo 24 works on the fork lift truck. Furthermore, when the fork 23 is not fully tilted rearward, the CPU 32 controls the tilt cylinder so as to fully tilt the fork rearward before the completion of the forward/reverse shifting operation.

Figure 11:
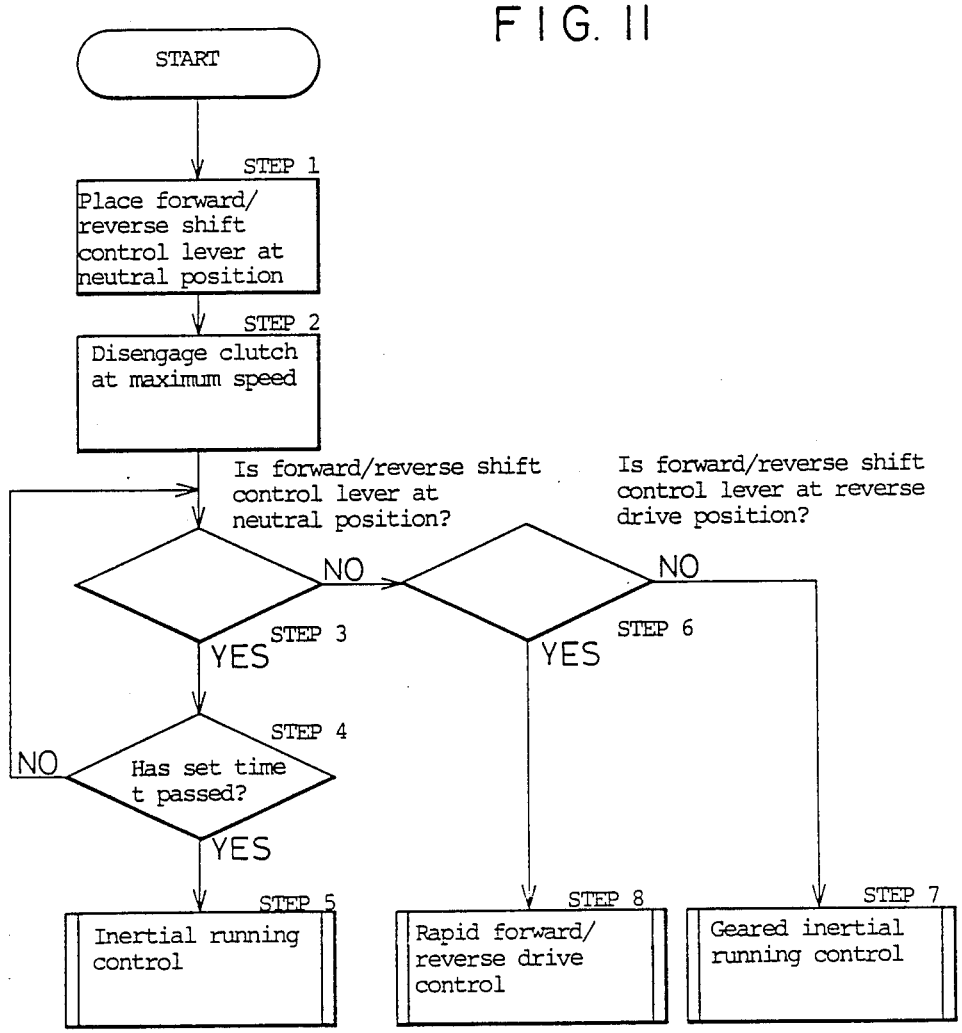
FIGS. 11 and 12 are flow charts of assistance in explaining the process of the rapid forward/reverse shifting operation of the forward/reverse drive controller of FIG. 8.
Figure 12:
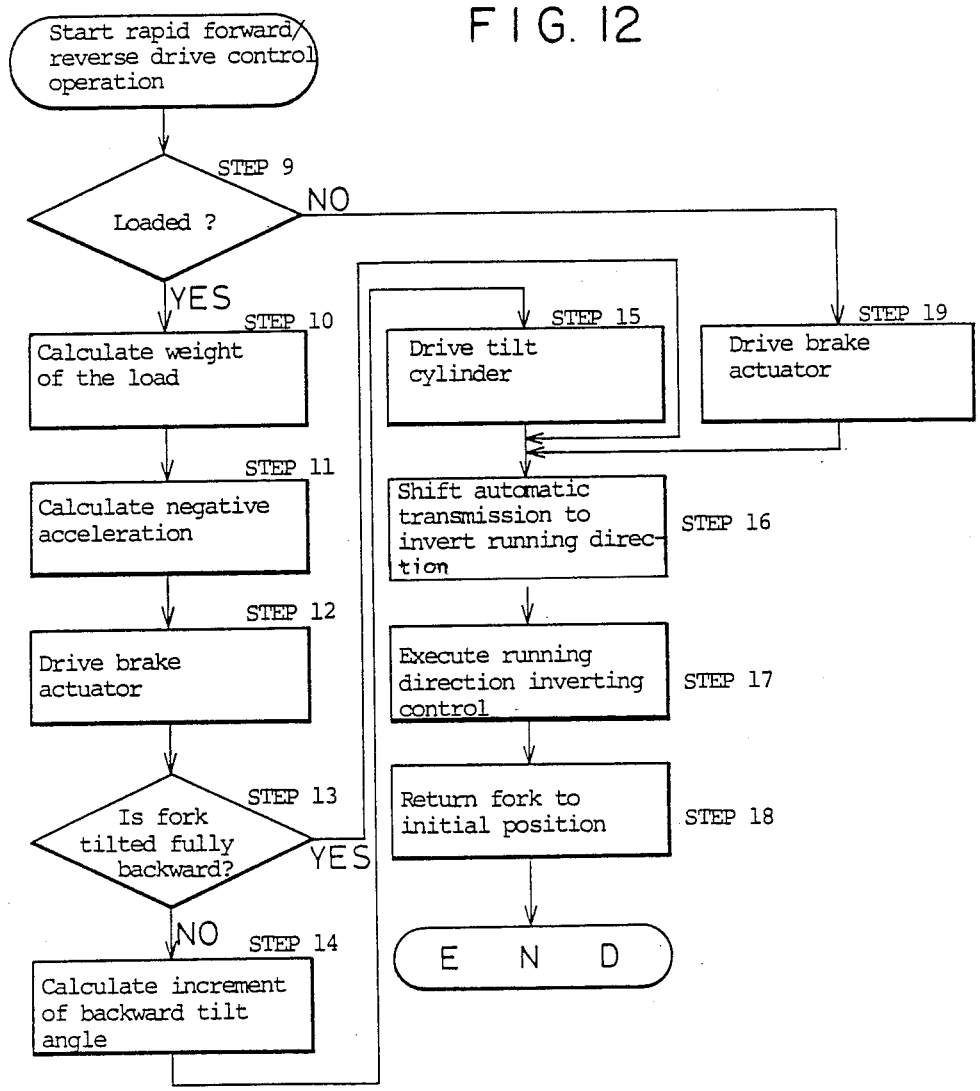

The functions of the electrical circuits thus constituted will be described with reference to the flow charts shown in FIGS. 11 and 12.

Suppose that the forward/reverse shift control lever 20 is shifted from the forward gear position to the neutral position while the fork lift truck is running forward at a predetermined running speed. Then, the CPU 32 decides, on the basis of the detection signal of the forward/reverse gear position detector 19, that the forward/reverse shift control lever 20 has been shifted to the neutral position (Step 1), and then disengages the dry single disk clutch 2 at the maximum speed by controlling the clutch controlling actuator 6 through the interface 12 and the actuator driving circuit 35 (Step 2). At the same time, the CPU 32 operates a built-in timer thereof and makes a decision as to whether or not the forward/reverse shift control lever 20 is shifted from the neutral position to a position other than the neutral position within a predetermined time (hereinafter referred to "set time t"; the set time t in this embodiment is 1 sec) (Steps 3 and 4).

If the forward/reverse shift control lever 20 is held at the neutral position after the passage of the set time t, the CPU 32 executes an inertial running control routine for the inertial running of the fork lift truck (Step 5). That is, the CPU 32 decides, upon the elapse of the set time t, that an inertial running mode is chosen, then controls the forward/reverse shifting actuator 8 to shift the automatic transmission 3 from the forward gear to the neutral, and then engages the dry single disk clutch 2, which has been previously disengaged. Consequently, the fork lift truck runs by inertia.

On the other hand, if the forward/reverse shift control lever 20 is shifted again to the forward gear position within the set time t, the CPU 32 decides that a geared inertial running mode is chosen (Step 6) and executes a geared inertia running control routine for the forward running of the fork lift truck (Step 7). That is, upon the shift of the forward/reverse shift control lever 20 to the forward gear position, the CPU 32 merely engages the dry single disk clutch 2. Consequently, the fork lift truck continues its forward running. If the forward/reverse shift control lever 20 is shifted to the reverse gear position within the set time t, the CPU 32 decides that a rapid to-and-fro running mode is chosen (Step 6), and then executes a rapid forward/reverse shift control routine for the rapid to-and-fro running of the fork lift truck (Step 8).

After the rapid forward/reverse shift control operation has been started, the CPU 32 makes a decision on the basis of the detection signal of the load detector 21 as to whether or not the fork lift truck is loaded (Step 9). When the fork lift truck is loaded, the CPU 32 calculates the weight of the cargo (Step 10), and then calculates a suitable negative acceleration An corresponding to the load Ld on the basis of data stored beforehand in the program memory 33 (Step 11). Then, the CPU 32 controls the brake actuator 27 through the input-output interface 12 and the actuator driving circuit 26 so that the negative acceleration An is obtained (Step 12) to decelerate the fork lift truck. In decelerating the fork lift truck, the CPU 32 calculates the running speed on the basis of the detection signal of the running speed sensor 11 and calculates the negative acceleration on the basis of the variation of the running speed to decide from moment-to-moment whether or not the fork lift truck is decelerated at the predetermined negative deceleration.

When the fork 23 is loaded with a cargo 24, the CPU 32 decides on the basis of the detection signal of the stroke detector 43 whether or not the fork 23 is fully tilted rearward (Step 13). When the fork 23 is not tilted fully rearward, the CPU 32 calculates an increment of rearward tilt angle necessary for tilting the fork 23 to the fully tilted position (Step 14), and then controls the control valve driving unit 45 through the input-output interface 12 and the actuator driving circuit 46 to drive the tilt cylinder 42 by an extent corresponding to the increment of rearward tilt angle (Step 15).

When the running speed calculated from moment-to-moment on the basis of the detection signals of the running speed sensor 11 becomes lower than a predetermined running speed where the shift of the forward drive gear to the reverse drive gear is possible, the CPU 32 controls the forward/reverse shifting actuator 8 through the actuator driving circuit 37 to shift the automatic transmission 3 from the forward drive gear to the reverse drive gear (Step 16).

After the automatic transmission 3 has been shifted from the forward drive gear to the reverse drive gear (Step 16), a control operation for inverting the running direction of the fork lift truck is carried out (Step 17). That is, the clutch 2 is engaged to further decelerate the fork lift truck and the brake actuator 27 is controlled so as to release the brake 28. Consequently, the fork lift truck is decelerated and, immediately after the fork lift truck has been stopped, the running direction of the fork lift truck is inverted for reverse running (Step 17). After the inversion of the running direction has been completed, the tilt cylinder 42 is operated again through the control valve driving unit 45 to place the fork at the initial rearward tilt angle (Step 18).

On the other hand, when the fork lift truck is not loaded at the start of the rapid to-and-fro running, the brake 28 is actuated through the brake actuator 27 so that the negative acceleration An is increased to the maximum (Step 19).

After Step 19 has been carried out, the operations of Step 16 and the following steps are executed in the above-mentioned procedure.

Although the procedure of the rapid forward/reverse drive shifting operation has been described in terms of the procedure for shifting forward drive to reverse drive, the rapid forward/reverse drive shifting operation for shifting the reverse drive to the forward drive is achieved through a similar procedure.

As is apparent from the foregoing description, the forward/reverse drive controller in the second embodiment controls the brake system of the vehicle automatically so that a negative acceleration according to the weight of the cargo 24 is applied to the vehicle during rapid to-and-fro running, and then changes the gear and engages the clutch after the vehicle has been decelerated to a predetermined running speed where the forward/reverse shifting operation is possible. Accordingly, satisfactory deceleration is always possible regardless of the skill of the driver and the variation of the weight of load, and hence there is no danger of the cargo falling off the fork during the deceleration of the fork lift truck due to unbalanced distribution of the weight, or of the automatic transmission being damaged.

Furthermore, in the second embodiment, since the fork 23 is fully tilted rearward before rapidly inverting the running direction of the fork lift truck from a forward direction to a reverse direction, or from a reverse direction to a forward direction, undesirable displacement of the load by inertia in inverting the running direction of the fork lift truck is absolutely prevented.

The present invention is not limited to the foregoing embodiments; for example, instead of the moment-to-moment calculation of the negative acceleration on the basis of the detection signals of the running speed sensor 11, the brake 28 may be controlled according to controlled braking variables of the brake 28 determined beforehand in relation to the negative acceleration of the vehicle with respect to a change in the load, and the brake actuator 27 and the operation of the tilt cylinder 42 for fully tilting the fork 23 rearward may be controlled concurrently. Although the forward/reverse drive controller according to the present invention has been described hereinbefore as employed in a fork lift truck, of course, the forward/reverse drive controller according to the present invention is applicable to other industrial vehicles including shovel loaders. The forward/reverse drive controller according to the present invention decelerates the vehicle automatically according to the weight of the cargo to a running speed where the forward/reverse shifting operation is possible, to carry out rapid to-and-fro running. Consequently, the rapid to-and-fro running operation is controlled so that the cargo is carried securely regardless of the skill of the driver, and there is no danger of damaging the automatic transmission.

Furthermore, when the fork 23 is loaded, the forward/reverse drive controller tilts the fork 23 automatically fully rearward before rapidly changing the running direction of the fork lift truck from a forward direction to a reverse direction or vice versa. Accordingly, displacement of the cargo on the fork 23 by inertia in inverting the running direction of the fork lift truck is absolutely prevented. Consequently, the cargo is carried securely regardless of the skill of the driver and rapid to-and-fro running operation is carried out without hindering the driving operation.

Figure 13:
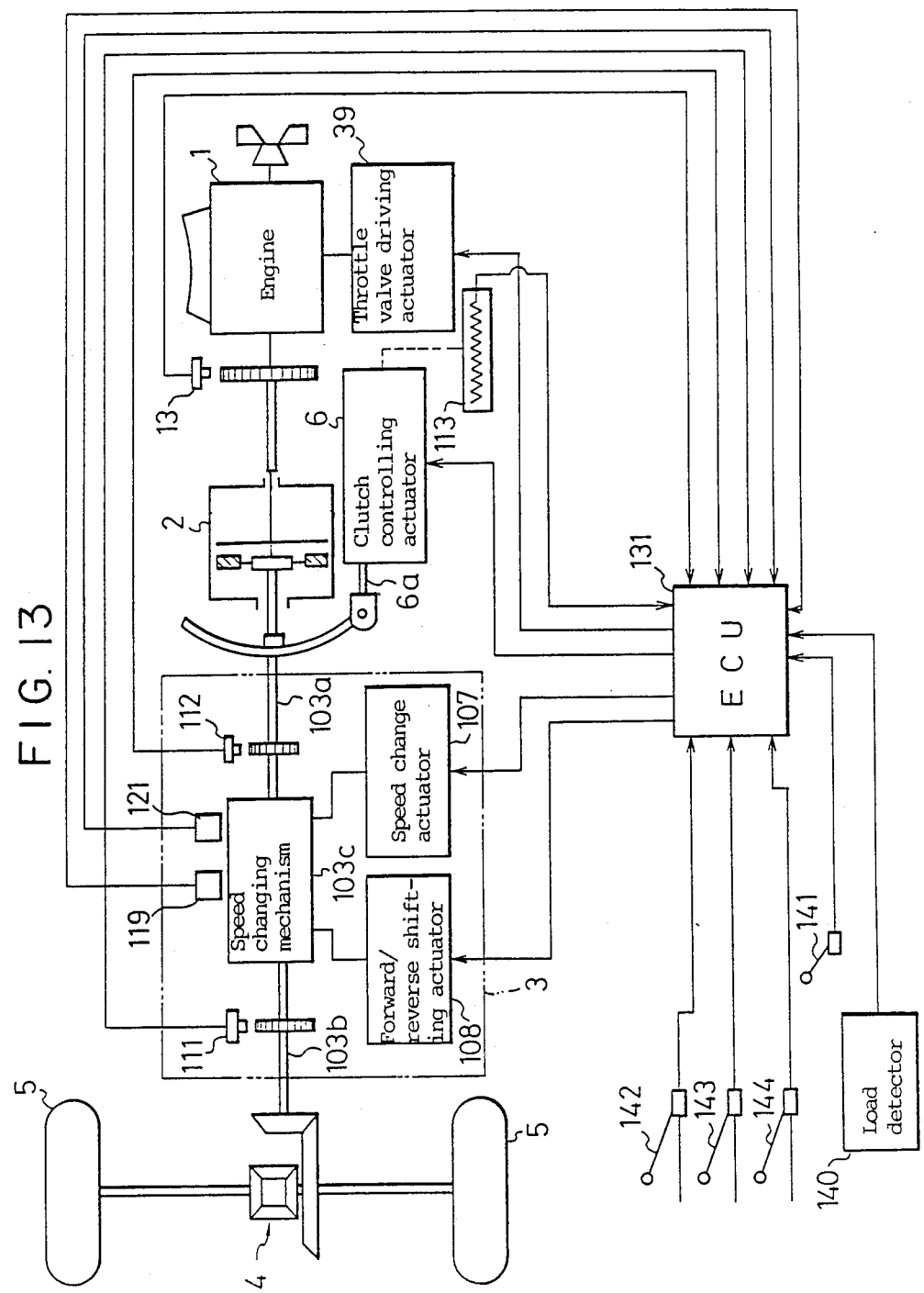
FIG. 13 is a block diagram of a forward/reverse drive controller according to a third embodiment of the present invention provided on an industrial vehicle, and the driving mechanism of the same vehicle.
Figure 14:
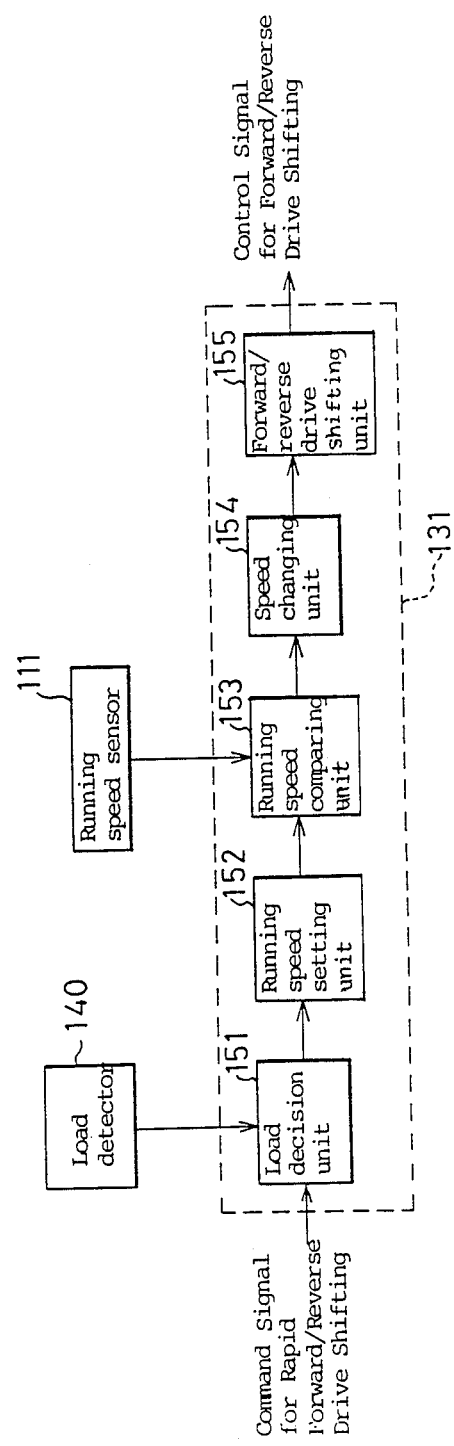
FIG. 14 is a block diagram of assistance in explaining the functions of an electronic control unit included in the third embodiment.
Figure 15:
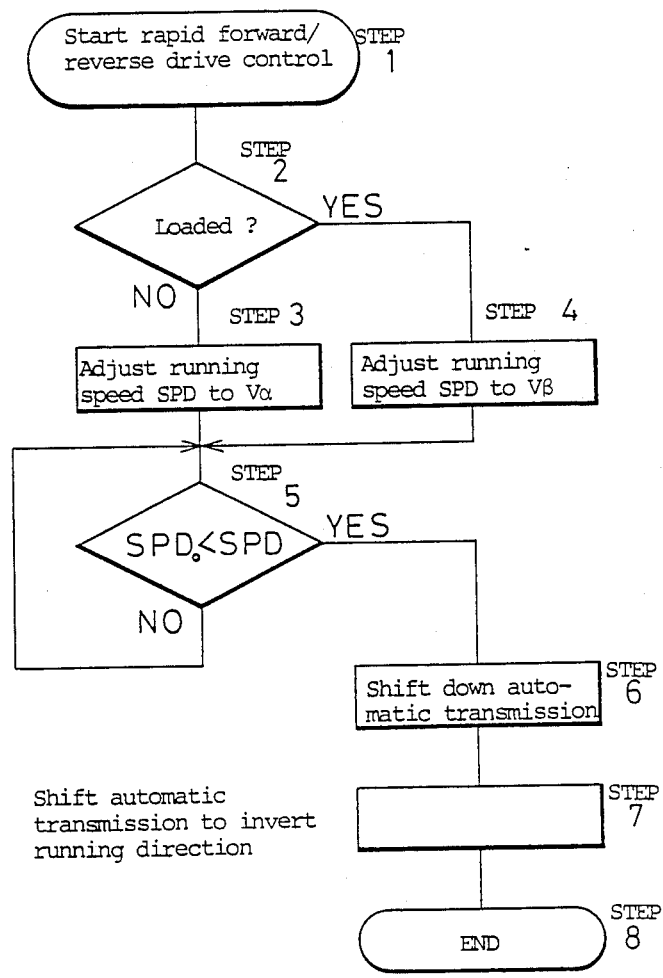
FIG. 15 is a flow chart of assistance in explaining the forward/reverse shifting operation of the third embodiment.

FIGS. 13 to 15 illustrate a forward/reverse drive controller in a third embodiment according to the present invention.

When applied to an industrial vehicle, the third embodiment varies the initial running speed in starting rapid to-and-fro running operation between a loaded condition and an unloaded condition of the industrial vehicle to secure the safety of the cargo.

FIG. 13 is a block diagram schematically showing the driving system of an industrial vehicle, in which a microprocessor is employed for controlling the automatic transmission. In this driving system, the forward/reverse shifting operation is controlled mainly by an electronic control unit (hereinafter abbreviated to "ECU") 131 in the form of a microprocessor.

Power produced by an engine 1 is transmitted through a clutch 2 to the input shaft 103a of an automatic transmission 3. The change gear mechanism 103c of the automatic transmission has a first speed, a second speed, a forward drive gear, and a reverse drive gear. The automatic transmission 3 is placed in the first speed or the second speed by a speed change actuator 107, and in the forward drive gear or reverse drive gear by a forward/reverse shifting actuator 108. The power of the engine 1 is transmitted through the output shaft 103b of the automatic transmission 3 and a differential gear 4 to wheels 5.

The ECU 131 receives command inputs from an accelerator pedal 142, a brake pedal 144 and a forward/reverse shift control lever 141 which are operated by the driver, and receives feedback inputs from a running speed sensor 111, an input shaft speed sensor 112, and engine speed sensor 13, a forward/reverse gear position detecting switch 119, a speed gear position detector 121 and a clutch sensor 113. The ECU 131 calculates, on the basis of those inputs, a speed changing point for smooth acceleration or deceleration without gear change shocks, as achieved by a skilled driver through a manual speed changing operation, and controls a throttle valve driving actuator 39, a clutch controlling actuator 6, a speed change actuator 107, and a forward/reverse shifting actuator 108. An inching pedal 143 is operated by the driver in loading/unloading work to control the running speed of the vehicle.

The rapid to-and-fro running operation is controlled also by the ECU 131 as part of the control of the automatic transmission 3. In order to reduce shocks and to avoid the exposure of the speed changing mechanism 103c of the automatic transmission 3 to undue load during the rapid to-and-fro running operation, the automatic transmission 3 is shifted down for inverting the running direction of the vehicle from a forward direction to a reverse direction or vice versa so as to start the forward/reverse shifting operation after the running speed of the vehicle has been reduced below a pre-set threshold speed. A load detector 140 for detecting the loaded condition of the industrial vehicle sends a detection signal to the ECU 131. The threshold speed is varied according to the detection signal of the load detector 140.

In the forward/reverse shifting operation, the microprocessors of the ECU 131 function as functional units as shown in FIG. 14. In FIG. 14, indicated at 151 is a load decision unit which decides whether the vehicle is loaded or unloaded on the detection signal of the load detector 140; at 152 is a running speed setting unit which decides a running speed at which the rapid forward/reverse shifting operation is to be started, on the basis of the decision signal of the load decision unit 151 according to the loaded condition of the vehicle; at 153 is a running speed comparing unit which compares the present running speed of the industrial vehicle with a set speed set by the running speed setting unit 152, and then provides a signal upon the reduction of the present running speed below the set speed; at 154 is a speed changing unit which shifts down the automatic transmission upon the reception of the output signal of the running speed comparing unit 153, and at 155 is a forward/reverse drive shifting unit which provides a control signal for forward/reverse drive shifting.

FIG. 15 is a flow chart showing the steps of operation of the above-mentioned third embodiment.

The steps of the control routine will be described hereinafter with reference to the flow chart of FIG. 15.

Step 1: The forward/reverse shift control lever 141 is operated to start the control of the rapid to-and-fro running operation.

Step 2: A decision is made on the basis of a detection signal provided by the load detector 140. When the decision is YES, the routine goes to Step 4 and, when NO, the routine goes to Step 3.

Step 3: A set running speed $V\alpha$ is set as a forward/reverse shifting operation starting speed SPD for an unloaded condition, and then the routine goes to Step 5.

Step 4: A set running speed $V\beta$ is set as a forward/reverse shifting operation starting speed SPD for a loaded condition, and then the routine goes to Step 5.

Step 5: The present actual running speed $SPD_O$ is compared with the set running speed SPD. When $SPD_O<SPD$, the routine goes to Step 6 and, when $SPD_O>SPD$, the routine returns to Step 5.

Step 6: The automatic transmission is shifted down to the first speed. Then, the routine goes to Step 7.

Step 7: The forward/reverse shifting operation is carried out. Then, the routine goes to Step 8.

Step 8: The forward/reverse shifting operation control is completed.

FIGS. 16 through 19 illustrate the constitution and operation of a forward/reverse drive controller in a fourth embodiment according to the present invention.

In the forward/reverse drive controller of the present embodiment, during a forward/reverse shifting operation, an automatic operation of a vehicle brake is carried out after the gear change operation of the automatic transmission by controlling the engagement of a clutch.

Figure 16:
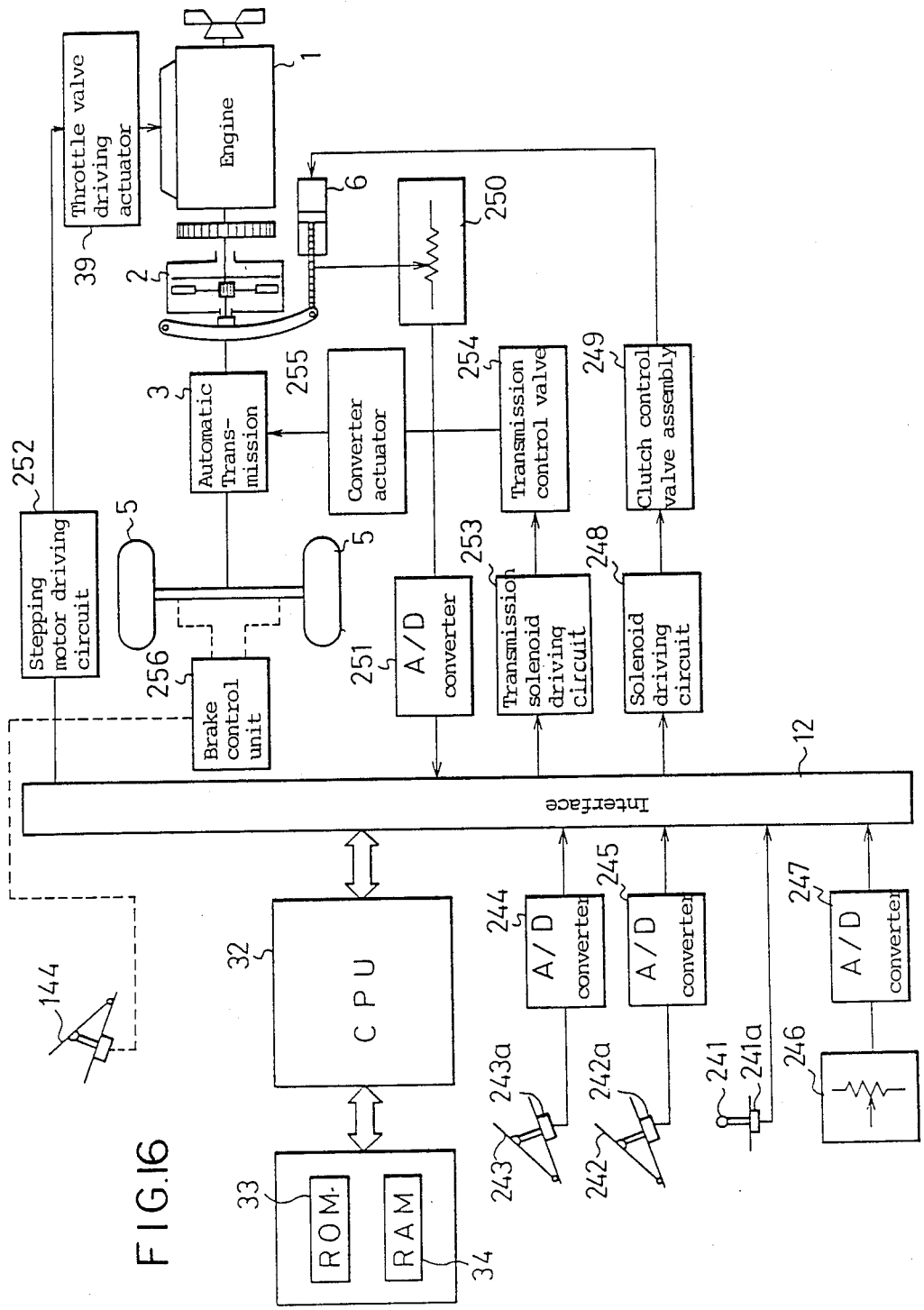
FIG. 16 is a block diagram showing the respective constitutions of a forward/reverse drive controller according to a fourth embodiment of the present invention provided on an industrial vehicle, and the driving mechanism of the same vehicle.

In FIG. 16, the same reference numerals as those in FIGS. 1, 2, 8, 9 and 13 designate the same or the like components, circuits and units.

In FIG. 16, indicated at 32 is a central processing unit (hereinafter abbreviated to "CPU") such as a microprocessor for controlling the entire system of the controller. A memory unit comprising a random access memory RAM 34 and a read-only memory ROM 33 is connected to the CPU 32 to constitute a microcomputer.

The CPU 32 receives command inputs from an inching pedal 243, an accelerator pedal 242, and a forward-/reverse shift control lever 241 which are operated by the driver, respectively through stroke detectors 243a and 232a, A/D converters 244 and 245, a lever switch 241a, and an interface 12. The inching pedal 243 is provided for fine speed control in handling cargo, and hence the inching pedal 243 is not an essential component of the present invention.

Indicated at 246 is a load detection sensor which detects the quantity of a load. The detection signal of the load detection sensor 246 is sent through an A/D converter 247 to the interface 12.

A control output for controlling the clutch 2 is sent to a clutch control solenoid driving circuit 248 to control a clutch control valve assembly 249. Hydraulic fluid is distributed through the clutch control valve assembly 249 to control the clutch 2 by means of a clutch actuator 6.

The condition of engagement of the clutch 2 is detected by a clutch stroke sensor 250. The detection signal of the clutch stroke sensor 250 is sent through an A/D converter 251 and the interface 12 to the CPU 32 as a feedback signal.

A throttle valve control output for the engine 1 is sent to a stepping motor driving circuit 252 to drive a throttle valve driving actuator 39 including a stepping motor, and thereby the degree of opening of the throttle valve is controlled.

In the system of this embodiment, the CPU 32 receives a command input from an accelerator pedal 242, and feedback inputs from sensors, not shown, such as a running speed sensor, an engine speed sensor, and an input shaft speed sensor for detecting the revolving speed of the input shaft of the automatic transmission, and then the CPU 32 calculates, on the basis of those inputs, a speed changing point enabling smooth acceleration or deceleration without causing speed changing shocks, as achieved by an experienced and skilled driver through a manual speed changing operation, and then the CPU 32 generates outputs to control the automatic transmission 3 as well as the engine throttle valve.

The output to control the automatic transmission 3 is sent to a transmission solenoid driving circuit 253, then the transmission solenoid driving circuit 253 provides an output to control a transmission control valve 254 so that a transmission actuator is driven hydraulically to shift the automatic transmission 3.

The brake pedal 144 is interlocked mechanically with a brake control unit 256 as indicated by broken lines in FIG. 16 to transmit the movement of the brake pedal 144 to the brake control unit 256 for braking the wheels 5.

In the fourth embodiment, the deceleration of the vehicle for the rapid forward/reverse shifting operation is controlled by the slipping engagement of the clutch, and hence brake control actuator need not be provided.

The functions of the forward/reverse drive controller in the fourth embodiment in the forward/reverse shifting operation will be described with reference to flow charts shown in FIGS. 17 and 18.

Figure 17:
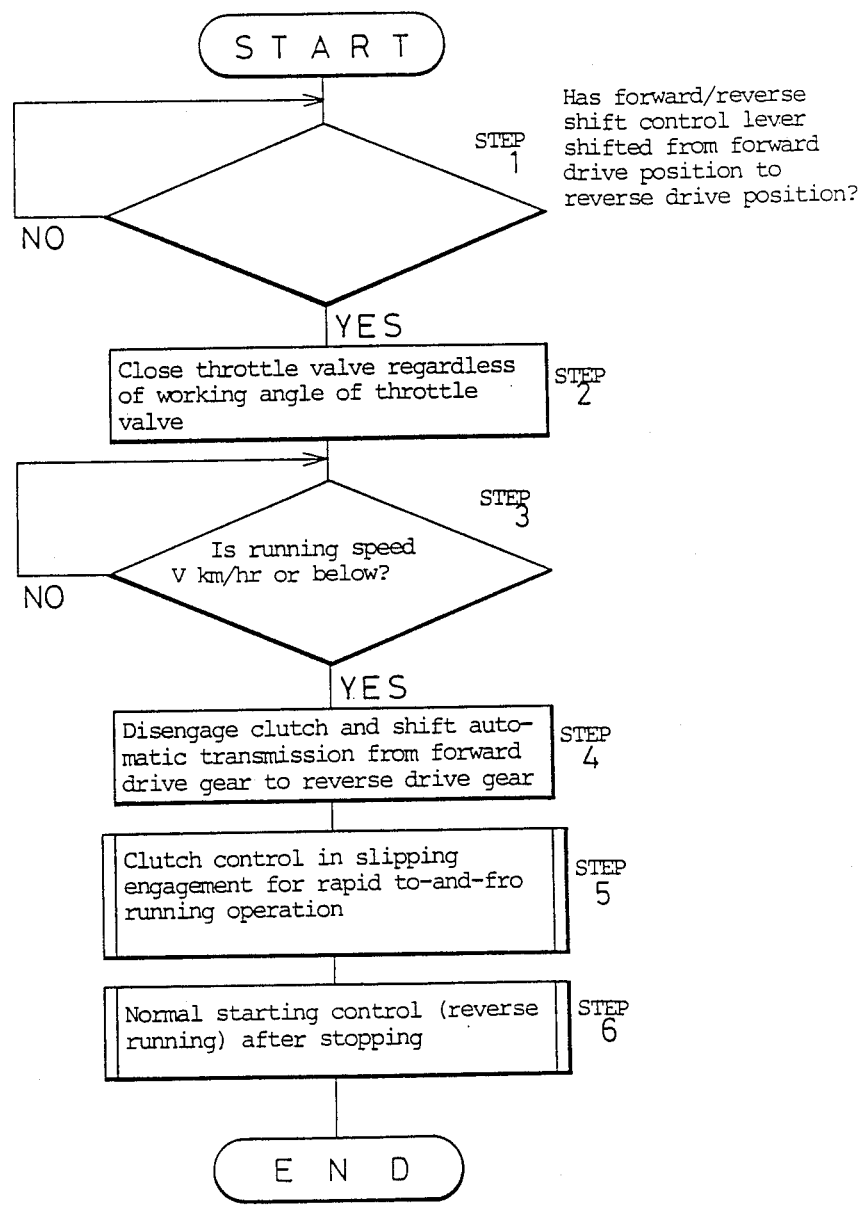
FIGS. 17 and 18 are flow charts of assistance in explaining the functions and manner of operation of the fourth embodiment.

FIG. 17 shows a general control procedure for the rapid forward/reverse shifting operation for rapidly changing the running direction of the vehicle from a forward direction to reverse direction. Steps of the control procedure will be described with reference to FIG. 17.

Step 1: A decision is made as to whether or not the forward/reverse shift control lever is shifted from the forward drive position to the reverse drive position. When the decision is YES, the routine goes to Step 2, and when NO, Step 1 is repeated.

Step 2: The throttle valve is closed regardless of the working angle of the accelerator pedal, and then the routine goes to Step 3.

Step 3: The present running speed is sampled, and then a decision is made as to whether or not the present running speed is lower than a threshold speed V km/hr. When the decision is YES, the routine goes to Step 4, and when NO, Step 3 is repeated.

Step 4: The clutch is disengaged and the automatic transmission is shifted from the forward speed to the reverse speed, and then the routine goes to Step 5.

Step 5: The degree of slipping engagement of the clutch is controlled to decelerate the vehicle for the forward/reverse shifting operation. (Details of this operation are illustrated in FIG. 18.)

Step 6: After the vehicle has been stopped, the vehicle is controlled for normal starting operation (reverse running).

Figure 18:
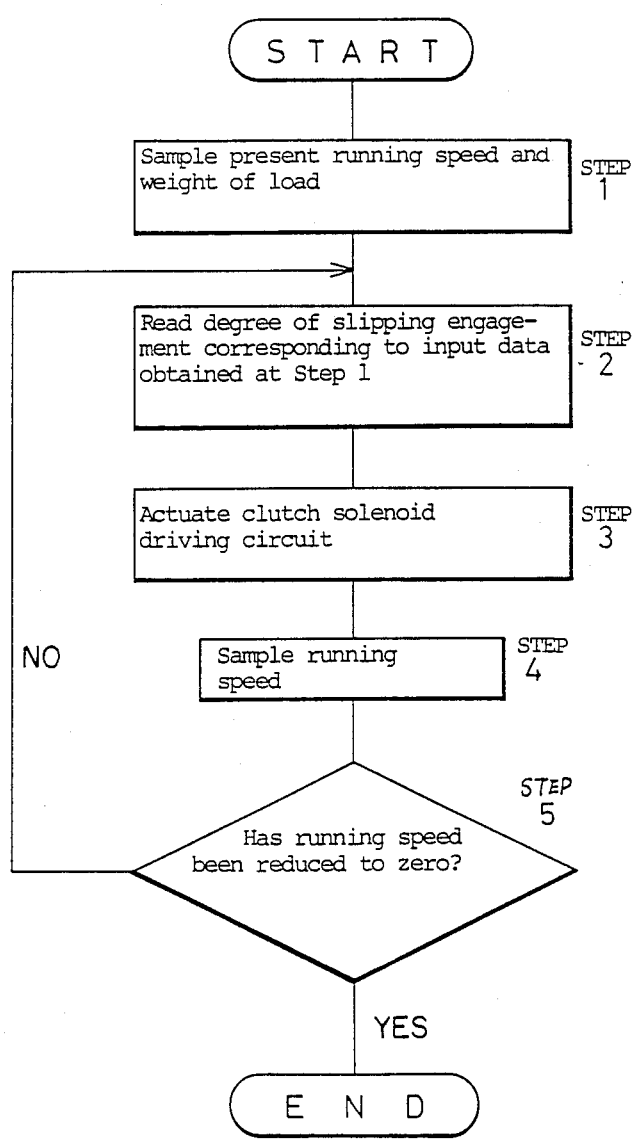

FIG. 18 is a flow chart showing the control procedure of Step 5 in FIG. 17 for controlling the degree of slipping engagement of the clutch during the rapid forward/reverse shifting operation. The control procedure shown in FIG. 18 will be described hereinafter.

Step 1: The prevent running speed and the quantity of the load are sampled, and then the routine goes to Step 2.

Step 2: A degree of slipping engagement stored in the ROM 33 at an address corresponding to the running speed and the quantity of the load sampled in Step 1 is read.

Step 3: A pulse signal having a predetermined duty ratio is sent to the clutch solenoid driving circuit 248 to regulate the clutch 2 at an optimum speed for braking the vehicle to a condition of slipping engagement corresponding to the degree of slipping engagement read at Step 2.

Step 4: The prevent running speed of the vehicle is sampled, and then the routine goes to Step 5.

Step 5: A decision is made as to whether or not the present running speed is zero. When the decision is YES, the routine is ended, and when NO, the routine returns to Step 2.

Figure 19:
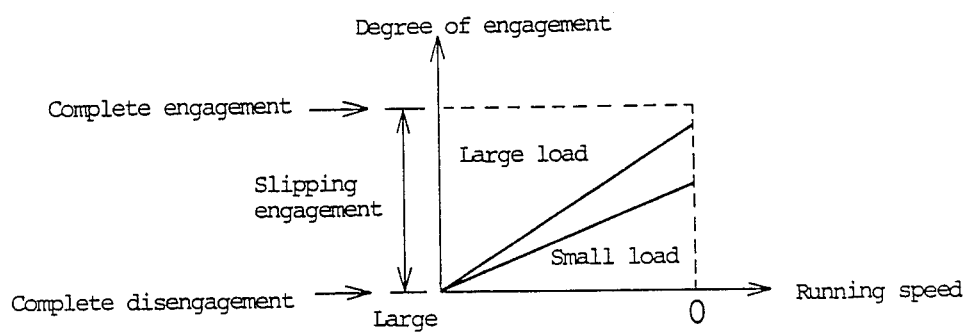
FIG. 19 is a graph showing the relationship between the running speed of the vehicle and the degree of engagement of the clutch of the industrial vehicle equipped with the fourth embodiment.

FIG. 19 is a graph showing the dependency of the degree of slipping engagement of the clutch on the running speed of the vehicle for the quantity of the load, by way of example.

As shown in FIG. 19, the degree of slipping engagement is decreased with the increase of the running speed, and the degree of slipping engagement for a greater quantity of load is greater than that for a smaller quantity of load at the same running speed.

The fourth embodiment improves the facility of the rapid forward/reverse shifting operation, prevents damage to the cargo by shocks, and reduces the cost of the forward/reverse drive controller through the omission of a special actuator for decelerating the vehicle.

Although the description of the invention has been made with reference to the preferred embodiments thereof, it is to be understood that many changes and variations will occur to those skilled in the art without departing from the scope of appended claims.

We claim:

1. A forward/reverse drive controller suitable for controling a forward/reverse shifting operation of a vehicle having an engine, an accelerator pedal, a clutch provided in a system for transmitting an output of the engine, to connect and disconnect the engine and a driven part, and an automatic transmission, which comprises, in combination:

clutch actuating means for changeably controlling a working condition of said clutch between an engaged state and a disengaged state through slipping engagement;

transmission driving means provided for said automatic transmission to shift said automatic transmission between three positions, namely, a forward speed position, a neutral position and a reverse speed position;

running speed detecting means for detecting a running speed of the vehicle;

a forward/reverse shift control lever which is manually shifted to a plurality of shift positions including a forward drive position, a neutral position, and a reverse drive position;

shift position detecting means for detecting a position of said forward/reverse shift control lever;

braking control means which actuates braking means of the vehicle to decelerate said vehicle upon detection of a shift of said forward/reverse shift control lever to invert a running direction of said vehicle;

decision means for deciding whether or not the running speed of the vehicle has been reduced to a predetermined running speed by said braking means, on the basis of the detection of running speed by said running speed detecting means; and shift control means which provides a command to actuate the transmission driving means in order to shift the automatic transmission according to decision of said decision means, when the running speed of said vehicle is reduced to said predetermined running speed, and provides a command upon completion of shifting of the automatic transmission to actuate the clutch actuating means and the transmission driving means in order to engage said clutch.

2. A forward/reverse drive controller according to claim 1, wherein said braking means of the vehicle controlled by said braking control means includes throttle valve driving means which closes a throttle valve of the engine to apply engine brake to the vehicle.

3. A forward/reverse drive controller according to claim 2, wherein said throttle valve driving means is controlled by said shift control means regardless of a working angle of said accelerator pedal when shifting of said forward/reverse shift control lever to a shift position for running in a direction opposite the present running direction of the vehicle is detected by said shift position detecting means.

4. A forward/reverse drive controller according to claim 1 or 2, wherein said shift control means includes means which disengages said clutch when a decision that running speed of the vehicle has been reduced to said predetermined running speed is made by said decision means, then provides a command to make said transmission driving means shift said automatic transmission to a drive position for running in a direction opposite the present running direction, and then makes said clutch driving means drive the clutch to place the clutch in slipping engagement upon the completion of the automatic transmission shifting operation.

5. A forward/reverse drive controller according to claim 1, wherein said decision means for making decision as to whether or not the running speed of the vehicle is reduced to the predetermined running speed by said braking means includes means for discriminating whether or not the running speed of the vehicle is reduced to a fixed running speed suitable for carrying out the shift of said automatic transmission.

6. A forward/reverse drive controller according to claim 1, wherein said shift control means comprises: timer means which is actuated upon detection of shifting of the forward/reverse shift control lever to the neutral position; first means which actuate said clutch actuating means to disengage said clutch upon detection of shifting of said forward/reverse shift control lever to the neutral position, and inhibits the provision of a command for shifting said automatic transmission during a predetermined time controlled by the timer means; second means which monitors through said shift position detecting means whether or not said forward/reverse shift control lever is shifted from the neutral position to a shift position other than the previous shift position within the predetermined time; third means which provides a command to actuate said transmission driving means for shifting said automatic transmission upon detection of shifting of said forward/reverse shift control lever from the neutral position to another shift position within the predetermined time, and then provides a command to engage said clutch upon completion of the automatic transmission shifting operation.

7. A forward/reverse drive controller according to claim 6, wherein said shift control means further comprises fourth means which decides that the vehicle is required to be contronled for geared inertial running when said second mean detects the shift of the forward/reverse shift control lever from the neutral position to the previous shift position within the predetermined time set by said timer means.

8. A forward/reverse drive controller according to claim 6, wherein said shift control means further comprises fifth means which decides that the vehicle is required to be controlled for inertial running when said second means detects that said forward/reverse shift control lever is held at the neutral position in the predetermined time set by said timer means.

9. A forward/reverse drive controller according to claim 1, wherein said vehicle is a fork lift track, and said forward/reverse drive controller further comprises: load detecting means for detecting whether or not said fork lift truck is loaded; a tilt cylinder for tilting the fork of the fork lift truck; tilt angle detecting means for detecting the backward tilt angle of the fork in tilting the fork backward by the tilt cylinder; and cylinder driving means for driving the tilt cylinder prior to the start of inversion of the running direction of the fork lift truck in the to-and-fro operation in which the fork lift truck runs alternately in opposite directions so that the fork is tilted at a maximum backward tilt angle, when the load detecting means provides a signal indicating that said fork is loaded and the tilt angle detecting means provides a signal indicating that said fork is not tilted at the maximum backward tilt angle during the to-and-fro running operation.

10. A forward/reverse drive controller according to claim 9, wherein said cylinder driving means comprises cylinder driving circuit means which operates in response to a driving command provided by said shift control means, and control valve means which is controlled by said cylinder driving circuit means for hydraulically driving the tilt cylinder.

11. A forward/reverse drive controller according to claim 1, wherein said vehicle is an industrial vehicle, and said forward/reverse drive controller further comprises: load detecting means for detecting the loaded condition of the industrial vehicle; decision means for deciding whether or not the industrial vehicle is loaded; and running speed setting means for setting a running speed depending on whether the industrial vehicle is loaded or unloaded, whereby a running speed allowing the start of the forward/reverse drive shifting operation is set depending on whether the industrial vehicle is loaded or unloaded.

12. A forward/reverse drive controller as recited in claim 11, wherein said forward/reverse drive controller further comprses comparing means for comparing a running speed set, on the basis of detection of said load detecting means, by said running speed setting means with an actual running speed detected by said running speed detecting means.

13. A forward/reverse drive controller according to claim 1, wherein said vehicle is an industrial vehicle, and said forward/reverse drive controller further comprises: loaded weight detecting means for detecting the weight of a load on the industrial vehicle; memory means storing data of a relation between an appropriate negative acceleration for rapid to-and-fro running operation and a load on the industrial vehicle; computing means which computes, on the basis of the data stored in the memory means, an appropriate negative acceleration according to the weight of the load detected by said loaded weight detecting means, for the rapid to-and-fro running operation; and another braking control means which controls said braking means of the vehicle so that the vehicle is decelerated at a negative acceleration computed by said computing means.

14. A forward/reverse drive controller according to claim 13, wherein said braking means is a brake system for mechanically braking wheels of said industrial vehicle.

15. A forward/reverse drive controller according to claim 1, wherein said vehicle is an industrial vehicle, and said forward/reverse drive controller further comprises: loaded weight detecting means for detecting the weight of a load on the industrial vehicle; memory means storing data of optimum degree of engagement of the clutch for a rapid to-and-fro running operation, according to both the weight of the load and the running speed; reading means for reading an optimum degree of engagement of the clutch from the memory means storing said data of optimum degree of engagement, according to the weight of the prevent load detected by said loaded weight detecting means and the present running speed detected by said running speed detecting means; and control means for controlling the clutch for slipping engagement according to the degree of engagement read by said means for reading an optimum degree of engagement, whereby the clutch is held in slipping engagement after shifting said automatic transmission for the rapid to-and-fro running operation until a running speed of the industrial vehicle detected by said running speed detecting means becomes zero.

16. A forward/reverse drive controller according to claim 15, wherein said means for controlling the clutch for slipping engagement controls the degree of engagement of the clutch hydraulically.

17. A forward/reverse drive controller according to claim 1, wherein said forward/reverse drive controller further comprises: working angle detecting means for detecting an working angle of the accelerator pedal; memory means storing predetermined values of the negative acceleration corresponding to the values of the working angle of the accelerator pedal; comparing means which compares a set negative acceleration corresponding to the present working angle of said accelerator pedal with the actual negative acceleration of said vehicle upon the rapid shift of the automatic transmission to invert the running direction of the vehicle; and control means for controlling a condition of engagement of the clutch on the basis of comparison by said comparing means so that an actual negative acceleration of the vehicle coincides with the set negative acceleration.

18. A forward/reverse drive controller according to claim 1, wherein said forward/reverse drive controller further comprises: decision means for deciding whether or not a command for a rapid to-and-fro running operation is provided; throttle valve driving means capable of operating a throttle valve of the engine; and throttle valve control means which makes the throttle valve driving means operative or inoperative depending on the decision of said decision means for deciding whether or not a command for the rapid to-and-fro running operation is provided, whereby the degree of opening of the throttle valve is adjustably regulated according to a working angle of the accelerator pedal by the throttle valve driving means when a command for the rapid to-and-fro running operation is provided, while the throttle valve is closed regardless of the working angle of the accelerator pedal when a command for the rapid to-and-fro running operation is not provided.

* * * * *